United States Patent
Dane et al.

(10) Patent No.: US 11,067,014 B2
(45) Date of Patent: Jul. 20, 2021

(54) SYSTEM AND METHOD FOR REDUCING ENGINE KNOCK

(71) Applicant: Cummins Inc., Columbus, IN (US)

(72) Inventors: Marten H. Dane, Columbus, IN (US); J. Steven Kolhouse, Columbus, IN (US); Thomas M. Yonushonis, Columbus, IN (US); J. Stephen Wills, Columbus, IN (US); Samuel C. Geckler, Columbus, IN (US)

(73) Assignee: Cummins Inc., Columbus, IN (US)

( * ) Notice: Subject to any disclaimer, the term of this patent is extended or adjusted under 35 U.S.C. 154(b) by 325 days.

(21) Appl. No.: 16/036,056

(22) Filed: Jul. 16, 2018

(65) Prior Publication Data

US 2018/0328298 A1 Nov. 15, 2018

Related U.S. Application Data

(60) Division of application No. 14/605,358, filed on Jan. 26, 2015, now Pat. No. 10,024,253, which is a (Continued)

(51) Int. Cl.
*F02D 41/00* (2006.01)
*F02B 29/04* (2006.01)
(Continued)

(52) U.S. Cl.
CPC ...... *F02D 41/0065* (2013.01); *F02B 29/0418* (2013.01); *F02B 29/0425* (2013.01); (Continued)

(58) Field of Classification Search
CPC .............. F02B 29/0418; F02B 29/0425; F02B 29/0437; F02B 29/0493; F02D 13/0238; (Continued)

(56) References Cited

U.S. PATENT DOCUMENTS

| 4,385,496 A | 5/1983 | Yamane |
| 5,429,100 A * | 7/1995 | Goto ....................... F02B 33/36 |
| | | 123/559.1 |

(Continued)

FOREIGN PATENT DOCUMENTS

| WO | 2010059081 | 5/2010 |
| WO | 2010107636 | 9/2010 |

OTHER PUBLICATIONS

PCT/US2013/053094, International Search Report and Written Opinion, dated Feb. 18, 2014, 11 pgs.

*Primary Examiner* — Brandon D Lee
(74) *Attorney, Agent, or Firm* — Taft Stettinius & Hollister LLP

(57) ABSTRACT

A method includes operating a spark ignition engine and flowing low pressure exhaust gas recirculation (EGR) from an exhaust to an inlet of the spark ignition engine. The method includes interpreting a parameter affecting an operation of the spark ignition engine, and determining a knock index value in response to the parameter. The method further includes reducing a likelihood of engine knock in response to the knock index value exceeding a knock threshold value.

19 Claims, 11 Drawing Sheets

Related U.S. Application Data continuation of application No. PCT/US2013/053094, filed on Jul. 31, 2013.

(60) Provisional application No. 61/677,671, filed on Jul. 31, 2012.

(51) Int. Cl.

| | |
|---|---|
| *F02D 13/02* | (2006.01) |
| *F02M 45/02* | (2006.01) |
| *F02M 26/06* | (2016.01) |
| *F02M 26/15* | (2016.01) |
| *F02M 26/25* | (2016.01) |
| *F02M 26/27* | (2016.01) |
| *F02M 26/28* | (2016.01) |
| *F02M 26/24* | (2016.01) |
| *F02M 26/33* | (2016.01) |
| *F02D 41/04* | (2006.01) |
| *F02D 9/04* | (2006.01) |
| *F02D 35/02* | (2006.01) |

(52) U.S. Cl.
CPC ...... *F02B 29/0437* (2013.01); *F02B 29/0493* (2013.01); *F02D 13/0238* (2013.01); *F02D 13/0261* (2013.01); *F02D 41/0007* (2013.01); *F02D 41/04* (2013.01); *F02M 26/06* (2016.02); *F02M 26/15* (2016.02); *F02M 26/24* (2016.02); *F02M 26/25* (2016.02); *F02M 26/27* (2016.02); *F02M 26/28* (2016.02); *F02M 26/33* (2016.02); *F02M 45/02* (2013.01); *F01N 2240/36* (2013.01); *F02D 9/04* (2013.01); *F02D 35/027* (2013.01); *F02D 2041/001* (2013.01); *F02D 2041/0067* (2013.01); *F02D 2200/0402* (2013.01); *Y02T 10/12* (2013.01); *Y02T 10/40* (2013.01)

(58) Field of Classification Search
CPC ............. F02D 13/0261; F02D 41/0007; F02D 41/0065; F02D 41/04; F02D 2041/001; F02D 2041/0067; F02D 2200/0402; F02D 35/027; F02D 9/04; F02M 26/06; F02M 26/15; F02M 26/24; F02M 26/25; F02M 26/27; F02M 26/28; F02M 26/33; F02M 45/02; F01N 2240/36; Y02T 10/144; Y02T 10/146; Y02T 10/18; Y02T 10/47

See application file for complete search history.

(56) References Cited

U.S. PATENT DOCUMENTS

| | | |
|---|---|---|
| 5,474,060 A | 12/1995 | Evans |
| 6,041,602 A | 3/2000 | Dickey |
| 6,138,649 A | 10/2000 | Khair et al. |
| 6,286,482 B1 | 9/2001 | Flynn et al. |
| 6,305,313 B1 * | 10/2001 | Cunkelman ............ G01K 11/06 116/217 |
| 6,354,264 B1 * | 3/2002 | Iwakiri ................. F02D 35/023 123/305 |
| 6,561,157 B2 | 5/2003 | zur Loye et al. |
| 6,907,870 B2 | 6/2005 | zur Loye et al. |
| 6,964,158 B2 | 11/2005 | Abdul-Khalek |
| 6,983,730 B2 | 1/2006 | Kuzuyama |
| 6,988,365 B2 | 1/2006 | Sasaki |
| 7,043,914 B2 | 5/2006 | Ishikawa |
| 7,066,158 B2 | 6/2006 | Kuzuyama |
| 7,121,254 B2 | 10/2006 | Wickman et al. |
| 7,131,403 B1 * | 11/2006 | Banga ..................... F01P 7/165 123/41.31 |
| 7,152,588 B2 | 12/2006 | Corba |
| 7,195,006 B2 | 3/2007 | Khair et al. |
| 7,255,090 B2 | 8/2007 | Fader et al. |
| 7,257,950 B2 | 8/2007 | Iwaszkiewicz |
| 7,261,097 B2 | 8/2007 | Gong et al. |
| 7,275,514 B2 | 10/2007 | Kuo et al. |
| 7,287,492 B2 | 10/2007 | Leone et al. |
| 7,380,544 B2 | 6/2008 | Raduenz |
| 7,409,925 B2 | 8/2008 | Sun et al. |
| 7,469,691 B2 | 12/2008 | Joergi et al. |
| 7,487,766 B2 | 2/2009 | Alger et al. |
| 7,512,479 B1 | 3/2009 | Wang |
| 7,597,089 B2 | 10/2009 | Endo |
| 7,654,246 B2 | 2/2010 | Wang et al. |
| 7,770,560 B2 | 8/2010 | Ulrey et al. |
| 7,822,531 B2 | 10/2010 | Alger, II et al. |
| 7,887,695 B2 | 2/2011 | Erwin et al. |
| 7,899,601 B2 | 3/2011 | Yun et al. |
| 8,408,189 B2 | 4/2013 | Lutz |
| 9,845,754 B2 | 12/2017 | Lana |
| 2005/0005908 A1 | 1/2005 | Tanei |
| 2005/0155578 A1 | 7/2005 | Ichise et al. |
| 2007/0131207 A1 | 6/2007 | Nakamura |
| 2007/0267002 A1 | 11/2007 | Schmid et al. |
| 2008/0167786 A1 * | 7/2008 | Sasaki ................... F02D 35/023 701/102 |
| 2008/0230041 A1 | 9/2008 | Brusslar et al. |
| 2009/0193794 A1 | 8/2009 | Robel et al. |
| 2009/0266344 A1 | 10/2009 | Alger, II et al. |
| 2010/0010729 A1 | 1/2010 | Stein et al. |
| 2010/0101226 A1 | 4/2010 | Shutty et al. |
| 2010/0206249 A1 | 8/2010 | Bromberg et al. |
| 2010/0288232 A1 | 11/2010 | Bromberg et al. |
| 2010/0318284 A1 | 12/2010 | Surnilla et al. |
| 2011/0010076 A1 | 1/2011 | Shutty et al. |
| 2011/0010079 A1 * | 1/2011 | Shutty ................... F02D 41/005 701/108 |
| 2011/0072801 A1 | 3/2011 | Lupescu et al. |
| 2011/0088657 A1 | 4/2011 | Tanno |
| 2011/0088674 A1 | 4/2011 | Shutty et al. |
| 2011/0093182 A1 | 4/2011 | Weber |
| 2012/0137993 A1 * | 6/2012 | Kim ........................ F01P 7/165 123/41.11 |
| 2013/0096809 A1 * | 4/2013 | Haeming ................ F02P 5/152 701/111 |
| 2013/0239669 A1 * | 9/2013 | Hagari .................... F02D 41/18 73/114.16 |

\* cited by examiner

SYSTEM AND METHOD FOR REDUCING ENGINE KNOCK

CROSS-REFERENCE TO RELATED APPLICATIONS

The present application is a divisional of U.S. patent application Ser. No. 14/605,358 filed on Jan. 26, 2015, issued as U.S. Pat. No. 10,024,253 on Jul. 17, 2018, which is a continuation of International Patent App. No. PCT/US2013/053094 filed on Jul. 31, 2013, which claims priority to, and the benefit of the filing date of, U.S. Provisional App. No. 61/677,671 filed Jul. 31, 2012, each of which is incorporated herein by reference for all purposes in its entirety.

BACKGROUND

The present application relates to engine control systems and more particularly, but not exclusively, to engine control systems for controlling knock within spark-ignition gasoline engines.

Internal combustion engines can generally be grouped into one of two classes: spark-ignition and compression-ignition engines. Spark-ignition engines typically operate by introducing a stoichiometric mixture of air and fuel into a cylinder of an engine. A piston then compresses this mixture, and at a predetermined crankshaft angle, a spark plug will ignite the air/fuel mixture producing a flame front that propagates through the combustion chamber. The rapid increase in heat from the burned fuel triggers an increase in pressure which forces the piston downward in the cylinder. The ability to precisely time the combustion event through the use of a spark plug is a benefit of the spark-ignition engine. However, the spark-ignition engine may be somewhat inefficient since the compression ratio of the engine is kept to a relatively low level to avoid "knock." Knock occurs when the air/fuel mixture ignites independently of the spark plug and may cause engine damage. Consequently, spark-ignition engines typically have compression ratios in a range of 8 to 11.

The compression-ignition engine, on the other hand, operates at relatively high compression ratio that is typically within the range of 15 to 22. This high compression ratio boosts the mechanical efficiency of the compression-ignition engine. The compression-ignition engine operates by introducing unthrottled air into the cylinder to increase the efficiency over that of the throttled spark-ignition engine by decreasing pumping losses. In a traditional compression-ignition engine, ignition timing is controlled by the injection of diesel fuel into the cylinder near the end of the compression stroke, when the trapped air within the combustion chamber is of a sufficient temperature to ignite the fuel. The heat released during the combustion process causes an increase in in-cylinder pressure which then forces the piston downward in the same fashion as the spark-ignition engine.

While more efficient than spark-ignition engines, compression-ignition engines produce more of certain types of emissions which often require expensive aftertreatment. Consequently, it would be desirable to improve spark-ignition engines so as to control, minimize or otherwise prevent the occurrence of knock therein.

SUMMARY

One embodiment of the present invention is a unique system for controlling an operation of an engine. Other embodiments include unique methods, systems, devices, and apparatus to control, minimize or otherwise prevent the occurrence of knock within a spark-ignition engine. Further embodiments, forms, objects, aspects, benefits, features, and advantages of the present invention shall become apparent from the figures and description provided herewith.

DETAILED DESCRIPTION OF ILLUSTRATIVE EMBODIMENTS

Figure 1:
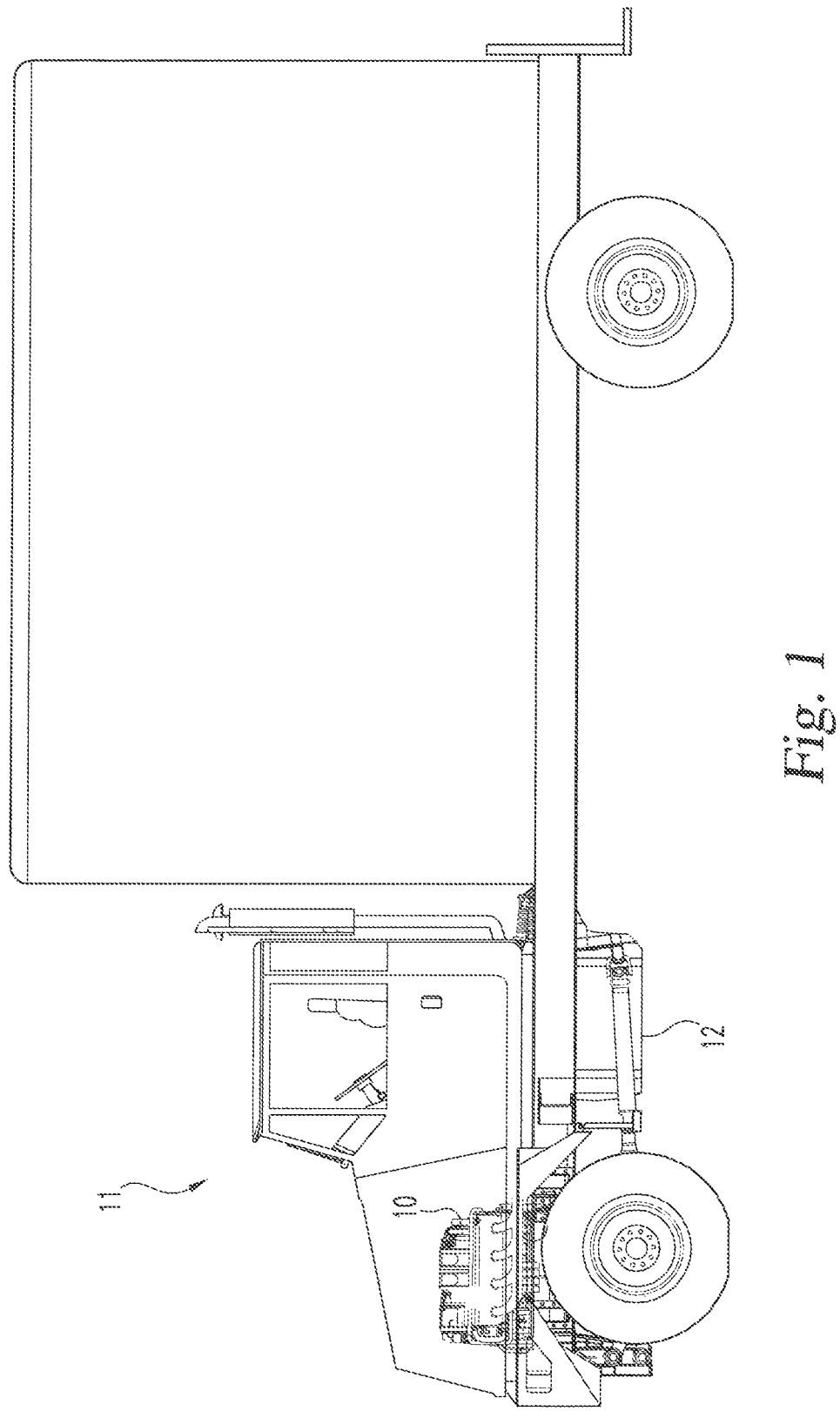
FIG. 1 is a schematic view of an system incorporated within a vehicle.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

FIG. 1 is a diagrammatic view of an engine 10 disposed within a vehicle 11 having a fuel tank 12. Although the vehicle 11 is illustrated as a medium-duty truck, the vehicle 11 could alternatively be any of a variety of other vehicle types such as a light-duty or heavy-duty truck, semi-tractor, bus, car, SUV, motor coach, or different variety of land traveling vehicle. In other embodiments, the vehicle 11 may be of a marine or aircraft type. In certain embodiments, the engine 10 is disposed within an application that is not a vehicular application. As will be described in greater detail, an engine control system may be provided to control, minimize or otherwise prevent the occurrence of knock within the engine 10.

Figure 2:
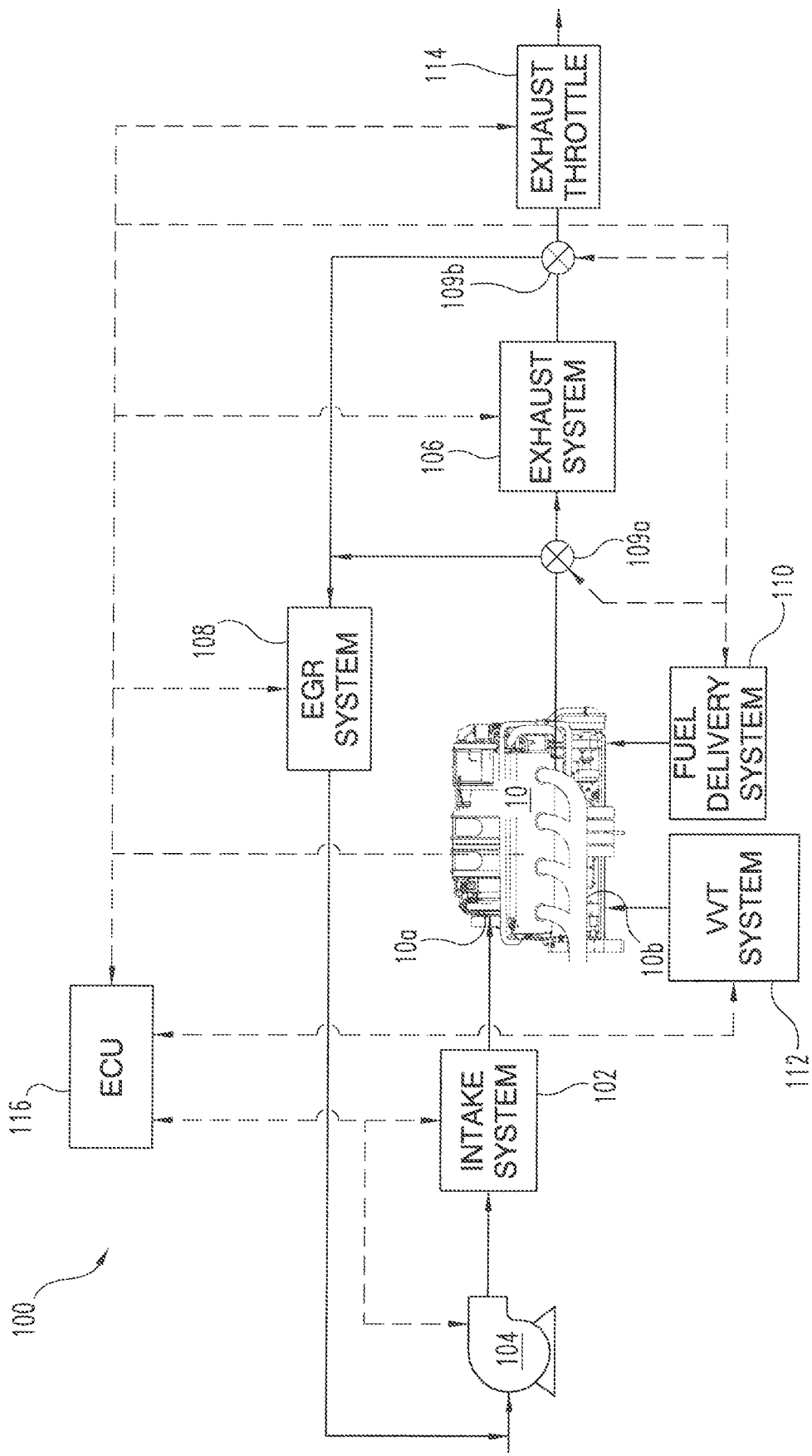
FIG. 2 is a schematic view of an engine control system according to one embodiment.

Referring to FIG. 2, an example engine control system 100 includes an engine 10 having an intake manifold 10*a* and an exhaust manifold 10*b*. In the illustrated embodiment, the engine control system 100 includes an intake system 102 fluidly coupled to the intake manifold 10*a*, the intake system receiving compressed intake gases from a compressor 104. The example system 100 includes an EGR system 108 receiving exhaust gases through a first valve 109*a* and/or through a second valve 109*b*, and returning the exhaust gases to a position upstream of the compressor 104. Any compressor 104, or each compressor, may be a directly powered compressor 104 (e.g. a supercharger), and/or a compressor side of a turbocharger (e.g. see the description referencing FIG. 5).

One of skill in the art will recognize the arrangement of the system 100 as a low pressure EGR system 108. The low pressure EGR system 108 provides for lower pumping losses relative to a high pressure EGR system (not shown), and further provides for a lower backpressure on the engine exhaust side, reducing residual gases in the cylinder and thereby reducing the tendency of the engine to experience knock. In certain embodiments, the EGR system 108 delivers the returned exhaust gases downstream of the compressor 104 (a high pressure EGR system), returns the exhaust gas to a position upstream of a first compressor and downstream of a second compressor (not shown), or returns the exhaust gases to a position upstream of two compressors (not shown). The return position of the EGR system 108, in certain embodiments, is selectable by the ECU 116, and the return position of the EGR system 108 is an example engine operational parameter controllable by the ECU 116 to reduce the likelihood of engine knock.

The inlet position of the EGR system 108 may be at a position upstream of the exhaust system 106, at a position downstream of the exhaust system 106, and/or at a position upstream of an exhaust throttle 114. In certain embodiments, the exhaust throttle 114 is controllable, without limitation, to provide back pressure and flow control for the EGR system 108. In certain embodiments, the system 100 does not include an exhaust throttle 114. The example system 100 illustrates the first valve 109*a* as an EGR valve provided upstream of the EGR system 108. In certain embodiments, the first valve 109*a* is provided downstream of the EGR system 108 but before the EGR flow returns to the inlet side of the engine 10. In certain embodiments, the first valve 109*a* is omitted. In certain embodiments, the second valve 109*b* is provided downstream of the EGR system 108 but before the EGR flow returns to the inlet side of the engine 10. In certain embodiments, the second valve 109*b* is omitted. In certain embodiments, the inlet position of the EGR system 108 is selectable by the ECU 116, and the inlet position of the EGR system 108 is an example engine operational parameter controllable by the ECU 116 to reduce the likelihood of engine knock.

In certain embodiments, the controller is structured to functionally execute the operations of the controller. The description herein including the ECU 116 emphasizes the structural independence of the aspects of the ECU 116, and illustrates one grouping of operations and responsibilities of the ECU 116. Other groupings that execute similar overall operations are understood within the scope of the present application. ECU 116 elements may be implemented in hardware and/or as computer instructions on a non-transient computer readable storage medium, and ECU 116 elements may be distributed across various hardware or computer based components.

Example and non-limiting ECU 116 implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the ECU 116 specification, any actuator including at least an electrical, hydraulic, or pneumatic actuator, a solenoid, an op-amp, analog control elements (springs, filters, integrators, adders, dividers, gain elements), and/or digital control elements.

The system 100 further includes a fuel delivery system 110 operationally coupled to the engine 10. The fuel delivery system 110 includes any fuel delivery system 110 known in the art to deliver a fuel type usable by the engine 10. Example fuel delivery systems 110 include a gasoline system with port fuel injection and/or direct injection, a gasoline and diesel system with the gasoline deliverable by port fuel injection and/or direct injection, a fuel delivery system 110 delivering a stoichiometric fuel with port fuel injection and/or direct injection, and a fuel delivery system 110 delivering a stoichiometric fuel and a compression ignition fuel where the stoichiometric fuel is deliverable by port fuel injection and/or direct injection. As used herein, a stoichiometric fuel is a fuel that is intended during normal operation to be combined with substantially a stoichiometric amount of oxygen, although non-stoichiometric formulations may be utilized in transient or even extended operations. Without limitation, example oxygen amounts on the low end of 80%, 90%, and 95% of stoichiometric, as well as example oxygen amounts of 105%, 110%, and 120% of stoichiometric on the high end, are substantially stoichiometric for certain applications.

The example system 100 further includes a variable valve timing (VVT) system 112. The components illustrated in the system 100 are example and non-limiting, and various components may be present or omitted in certain embodiments.

The system 100 further includes an ECU 116. Generally, the ECU 116 is communicatively coupled to component of the engine control system 100. Example connections are illustrated in FIG. 2, although in any given embodiment connections illustrated may not be present, and/or additional connections may be present. The ECU 116 forms a portion of a processing subsystem including one or more computing devices having memory, processing, and communication hardware. The ECU 116 may be a single device or a distributed device, and the functions of the controller may be performed by hardware or software.

The example, non-limiting, connections illustrated in FIG. 2 are represented by the dashed lines in FIG. 2. Arrows on the dashed lines pointing away from the ECU 116 indicate that the ECU 116 is structured to send control signals to the various components to control an operation of the component. Arrows on the dashed lines pointing toward the ECU 116 indicate that the ECU 116 is structured to receive operational signals from the various components indicating a parameter related to the operation of the component. Any illustrated connections may additionally or alternatively be available to the ECU 116 over a datalink or network, or be provided to a memory location readable by the ECU 116.

An example ECU 116 includes a processor (not shown) that is structured to execute operating logic defining various control, management, and/or regulation functions. Such operating logic may be in the form of dedicated hardware, such as a hardwired state machine, programming instructions, and/or a different form as would occur to those skilled in the art. The processor may be provided as a single component, or a collection of operatively coupled components; and may be comprised of digital circuitry, analog circuitry, or a hybrid combination of both of these types. When of a multi-component form, the processor may have one or more components remotely located relative to the others. The processor can include multiple processing units arranged to operate independently, in a pipeline processing arrangement, in a parallel processing arrangement, and/or such different arrangement as would occur to those skilled in the art.

In certain embodiments, the processor is a programmable microprocessing device of a solid-state, integrated circuit type that includes one or more processing units and memory. The processor can include one or more signal conditioners, modulators, demodulators, Arithmetic Logic Units (ALUs), Central Processing Units (CPUs), limiters, oscillators, control clocks, amplifiers, signal conditioners, filters, format converters, communication ports, clamps, delay devices, memory devices, and/or different circuitry or functional components as would occur to those skilled in the art to perform the desired control, management, and/or regulation functions. The memory devices can be comprised of one or more components and can be of any volatile or nonvolatile type, including the solid state variety, the optical media variety, the magnetic variety, any combination of these, or such different arrangement as would occur to those skilled in the art. In one form, the processor includes a computer network interface to facilitate communications using the Controller Area Network (CAN) standard among various components of the engine control system 100 and/or components not included in the depicted system, as desired.

In certain embodiments, the engine 10 is provided as a spark-ignition internal combustion engine, configured to develop mechanical power from internal combustion of a stoichiometric mixture of fuel and induction gas. As used herein, the phrase "induction gas" may include fresh air, recirculated exhaust gases, or the like, or any combination thereof. The intake manifold 10*a* receives induction gas from the intake system 102 and distributes the induction gas to combustion chambers of the engine 10. Accordingly, an inlet of the intake manifold 10*a* is disposed downstream of an outlet of the intake system 102, and an outlet of the intake manifold 10*a* is disposed upstream of an inlet of each of the combustion chambers in engine 10. The exhaust manifold 10*b* collects exhaust gases from combustion chambers of the engine 10 and conveys the exhaust gases to the exhaust system 106. Accordingly, an inlet of the exhaust manifold 10*b* is disposed downstream of an outlet of each of the combustion chambers in engine 10, and an inlet of the exhaust system 106.

Figure 3:
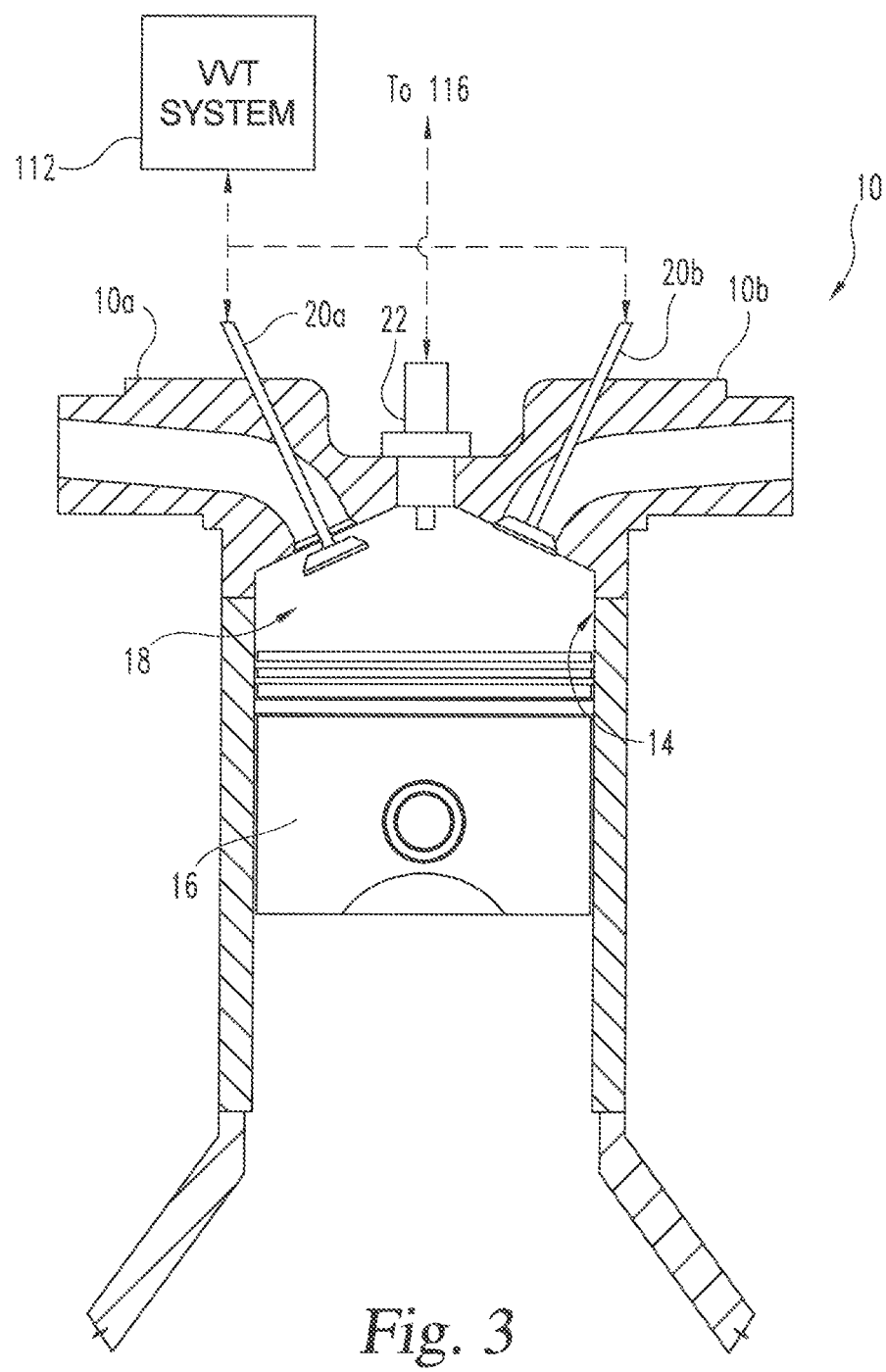
FIG. 3 is a partial schematic view of an engine according to one embodiment.

Referring to FIG. 3, the engine 10 may, for example, include a block with a cylinder 14 therein, and a piston 16 disposed within the cylinder 14. The cylinder 14, the piston 16 and a cylinder head define a combustion chamber 18 for internal combustion of a mixture of induction gas and fuel. Although FIG. 3 illustrates only one cylinder 14, piston 16 and combustion chamber 18, it will be appreciated that the engine 10 may include any number of cylinders, pistons and combustion chambers, which may all be of any size, and may operate according to any suitable speeds and loads. The engine 10 may further include an intake valve 20*a* and an exhaust valve 20*b* associated with each cylinder 14.

In one embodiment, the intake valve 20*a* can be controllably moved between open and closed positions (e.g., under control of the VVT system 112) to control the flow of induction gas into the combustion chamber 18 from the intake manifold 10*a*. In another embodiment, the exhaust valve 20*b* can be controllably moved between open and closed positions (e.g., under control of the VVT system 112) to control the flow of exhaust gas from the combustion chamber 18 to the exhaust manifold 10*b*. FIG. 3 illustrates the valves 20*a*, 20*b* under control of the VVT system 112, although in certain embodiments a non-variable valve timing system (not shown) is contemplated. Although FIG. 3 illustrates only one intake valve 20*a* and one exhaust valve 20*b* associated with the combustion chamber 18, it will be appreciated that any number of intake valves 20*a* and exhaust valves 20*b* may be associated with any combustion chamber 18. The example engine 10 further includes an ignition source such as spark plug 22 (or plugs). Although not shown, injectors may also be arranged within the engine 10 to deliver fuel directly into the combustion chamber 18. Referring back to FIG. 2, an improvement in engine knock management capability allows the engine 10 to operate at higher cylinder pressures providing for higher BMEP and allowing higher amounts of exhaust gas recirculation.

The intake system 102 is structured to adjust a temperature of the induction gas delivered to the engine 10. In one embodiment, the intake system 102 can be structured to lower or raise the temperature of induction gas delivered to the intake manifold 10*a*. As exemplarily illustrated, an inlet of the intake system 102 is disposed downstream of an outlet of the compressor 104 and an outlet of the intake system 102 is disposed upstream of the intake manifold 10*a*.

Figure 4:
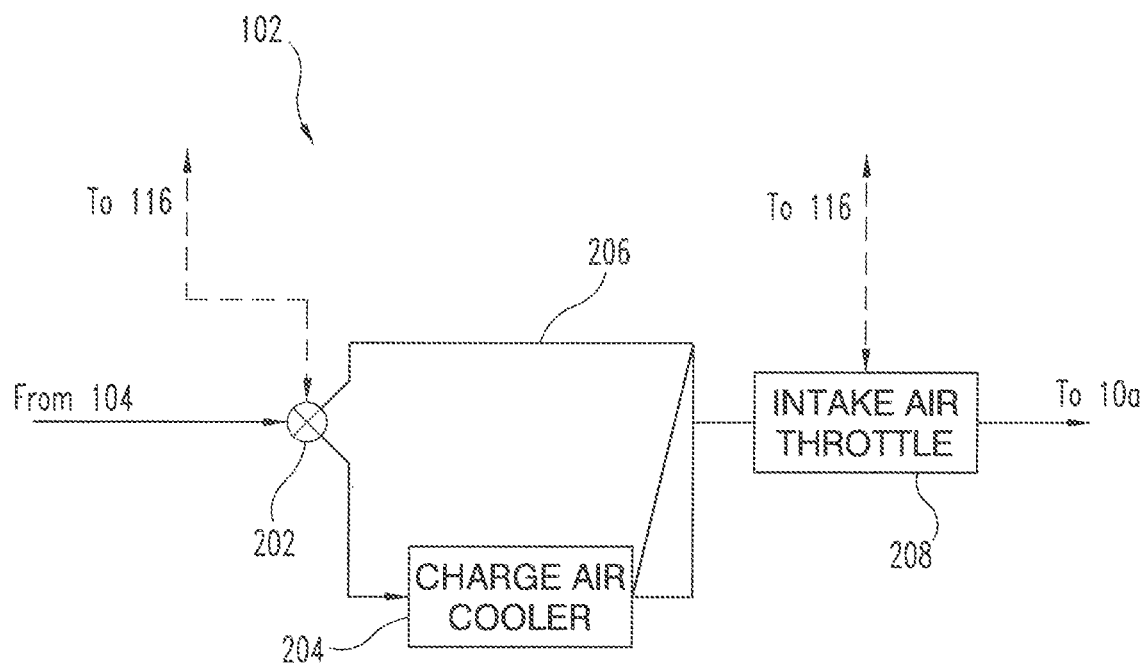
FIG. 4 is a schematic view of the intake system shown in FIG. 1, according to one embodiment.

Referring to FIG. 4, an example intake system 102 shown in FIG. 2 includes an charge air cooler bypass valve 202, a charge air cooler 204, a charge air cooler bypass circuit 206, and an intake air throttle 208. The charge air cooler 204 may be provided as an air-to-air cooler, a liquid-to-air cooler, or the like, and can be configured in any suitable manner. The intake air throttle 208 is configured to control the amount of induction gas flowing to the engine 10. The illustrated position of the intake air throttle 208 is a non-limiting example.

As exemplarily illustrated, the charge air cooler bypass valve 202 is structured to receive induction gas output from the compressor 104 and redirect the induction gas to the charge air cooler 204, to the charge air cooler bypass circuit 206, or a combination thereof. By redirecting the induction gas as described above, the temperature of the induction gas delivered to the engine 10 can be adjusted. In one embodiment, the charge air cooler bypass valve 202 is provided as a three port valve having a rotor that can be actuated (e.g., under control of ECU 116) to selectively place the inlet of the charge air cooler 204 or the charge air cooler bypass circuit 206 in fluid communication with the outlet of the compressor 104. In another embodiment, the charge air cooler bypass valve 202 can be actuated to adjust a ratio of induction gas flow into the charge air cooler 204 to induction gas flow into the charge air cooler bypass circuit 206. Although the charge air cooler bypass valve 202 has been described as a three port valve, it will be appreciated that the charge air cooler bypass valve 202 may be provided as any other suitable valve, or system of valves, enabling the selective redirection of induction gas among the charge air cooler 204 and the charge air cooler bypass circuit 206.

In an alternative embodiment, the charge air cooler bypass valve 202 may be replaced by an orifice or other restriction within a conduit conveying induction gas from the compressor 104. In yet another embodiment, the charge air cooler bypass valve 202 may be removed, providing a substantially unobstructed branch between conduits conveying induction gas to the inlets of the charge air cooler 204 and the charge air cooler bypass circuit 206.

As exemplarily illustrated, the charge air cooler bypass valve 202 is disposed upstream of the inlet of the charge air cooler 204, and upstream of the charge air cooler bypass circuit 206. In another embodiment, however, the charge air cooler bypass valve 202 can be disposed downstream of an outlet of the charge air cooler 204, downstream of the charge air cooler bypass circuit 206 and upstream of an inlet of the intake air throttle 208.

The charge air cooler 204 and charge air cooler bypass valve 202 are illustrated as downstream of a single compressor 104. In certain embodiments, the system 100 includes multiple compressors, and the charge air cooler 204 and charge air cooler bypass valve 202 may be positioned between the compressors, and/or downstream of all of the compressors. Additionally or alternatively, one or more compressors may each include a charge air cooler and charge air cooler bypass valve. The position of any charge air cooler bypass valve 202 is an example engine operational parameter controllable by the ECU 116 to reduce the likelihood of engine knock.

Referring back to FIG. 2, the compressor 104 is configured to compress induction gas such as fresh air from outside the engine control system 100, recirculated exhaust gas from the EGR system 108, or any other suitable oxidant from another source (not shown). In one embodiment, the compressor 104 may be provided as a centrifugal compressor. In another embodiment, the compressor 104 can be provided as a supercharger, which is driven by a belt, gear, shaft, chain, or the like or any combination thereof, connected to a crankshaft (not shown) of the engine 10. As exemplarily illustrated, an inlet of the compressor 104 is disposed downstream of an outlet of a fresh air intake (not shown) and downstream of an outlet of the EGR system 108.

Figure 5:
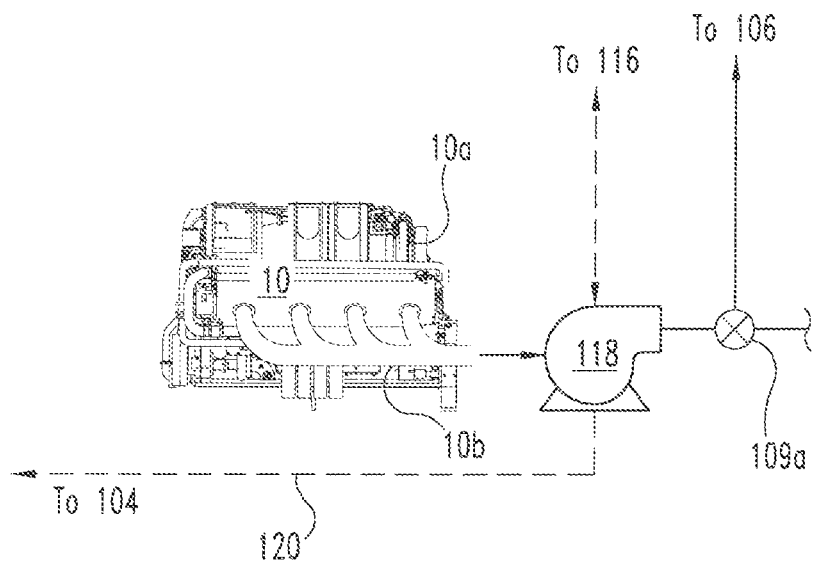
FIG. 5 is a partial schematic view of a engine control system according to another embodiment.

Referring to FIG. 5, in another embodiment, the compressor 104 may be provided as a component of a turbocharger. For example, the system 100 may further include a turbine 118 disposed at an outlet of the exhaust manifold 10b and mechanically coupled to the compressor 104 by a shaft, rod, or the like, thus forming the turbocharger. In one embodiment, the turbocharger may be provided as a variable geometry turbocharger capable of improving turbocharger efficiency over the entire engine map and, therefore, improving pumping efficiency. It will be appreciated, however, that the turbocharger may be provided in any other suitable manner (e.g., as a multi-stage turbocharger, or the like), and may be provided with or without a wastegate and/or bypass. The illustration in FIG. 5 shows the first valve 109a downstream of the turbine 118, in a low pressure EGR configuration.

Referring back to FIG. 2, an example exhaust system 106 is structured to reduce emissions from exhaust gas generated by the engine 10. The exhaust system 106 includes any aftertreatment components known in the art. Example aftertreatment components treat carbon monoxide (CO), unburned hydrocarbons (HC), nitrogen oxides ($NO_x$), volatile organic compounds (VOC), and/or particulate matter (PM). As exemplarily illustrated, an inlet of the exhaust system 106 is disposed downstream of an outlet of the exhaust manifold 10b.

Figure 6:
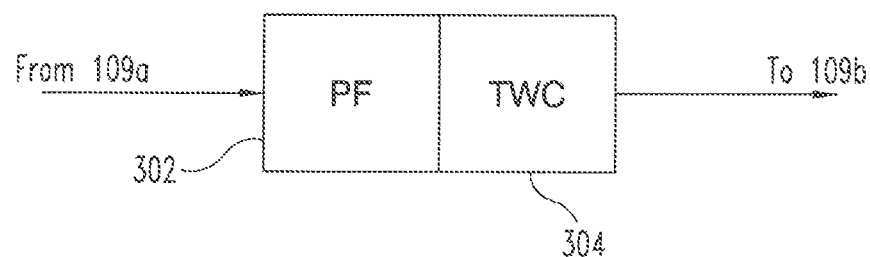
FIG. 6 is a schematic view of an embodiment of an exhaust system usage in embodiments of FIG. 2.

Referring to FIG. 6, one embodiment of the exhaust system 106 includes a particulate filter (PF) 302 disposed upstream of a catalytic converter 304 such as a three-way catalytic converter (TWC). The particulate filter 302 is structured to remove particulate matter such as carbon-based particulates, for example including soot, from the exhaust gas generated by the engine 10. The example catalytic converter 304 is structured to reduce nitrogen oxides to nitrogen and oxygen, oxidize carbon monoxide to carbon dioxide, and/or oxidize unburned hydrocarbons to carbon dioxide and water. The particulate filter 302 and catalytic converter 304 can be combined into a single housing (as illustrated) or can be provided in separate housings fluidly coupled by a conduit.

In certain embodiments, the particulate filter 302 requires periodic or intermittent regeneration, for example to oxidize trapped particles in the particulate filter 302. Regeneration of an example particulate filter 302 requires an elevated temperature, which may in certain operating conditions be readily available due to normal engine operations and in certain operating conditions may not be available without adjustment to normal engine operations. In certain embodiments, the catalytic converter 304 requires certain exhaust gas conditions to properly operate and/or regenerate. An example catalytic converter 304 requires continuous, periodic, and/or intermittent stoichiometric or rich conditions in the engine exhaust gases. The regeneration and operating conditions for the particulate filter 302 and catalytic converter 304 described herein are non-limiting examples.

Figure 7:
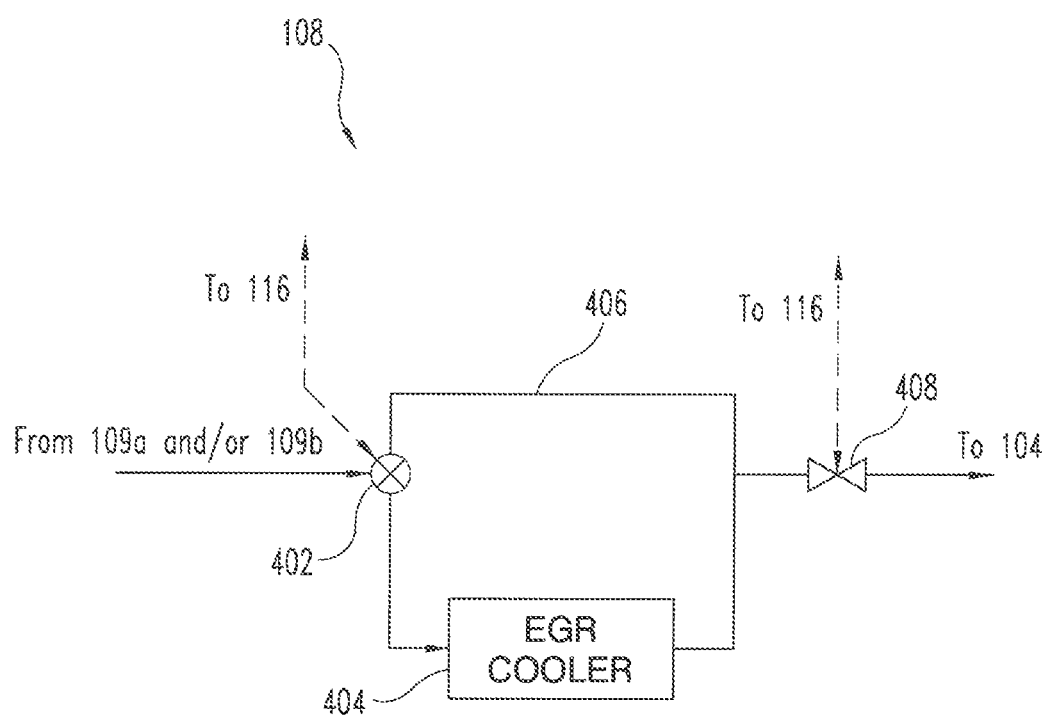
FIG. 7 is a schematic view of an embodiment of an exhaust gas recirculation system usable in embodiments of FIG. 2.

Referring to FIG. 7, one embodiment of the EGR system 108 shown in FIG. 2 includes an EGR cooler bypass valve 402, an EGR cooler 404, an EGR cooler bypass circuit 406, and an EGR valve 408. The EGR cooler 404 may be provided as an air-to-air cooler, a liquid-to-air cooler, or the like, and can be configured in any suitable manner. The EGR cooler 404 is structured to exchange heat between the coolant (air, engine coolant, etc.) and the EGR gas flowing through the EGR cooler 404. The position of the EGR bypass valve 402 is an example engine operational parameter controllable by the ECU 116 to reduce the likelihood of engine knock.

In certain additional or alternative embodiments to the EGR system 108 of FIG. 7, a coolant flow rate through the EGR cooler 404 is controllable by the ECU 116. Accordingly, a heat transfer rate within the EGR cooler 404 is controllable by the coolant flow rate. The coolant flow rate through the EGR cooler 404 is an example engine operational parameter controllable by the ECU 116 to reduce the likelihood of engine knock.

A system 100 including the charge air cooler bypass circuit 206 and the EGR cooler bypass circuit 406 permit the ECU 116 to reduce the temperature of induction gases at the intake manifold 10a in a flexible manner. The EGR cooler bypass circuit 406 permits the ECU 116 to continue to flow EGR at temperatures below the EGR condensation limit in applications where otherwise condensation would be destructive to, or reduce the service life of, the EGR cooler. The charge air cooler bypass circuit 206 and the EGR cooler bypass circuit 406 also allow the ECU 116 to advantageously utilize off-nominal high or low temperatures that occur, for example due to engine warm-up conditions and/or aftertreatment thermal management operations. The EGR valve 408, where present, is structured to control the amount of exhaust gas that recirculates.

As exemplarily illustrated, the EGR cooler bypass valve 402 is configured to receive exhaust gas output from the exhaust manifold 10b, the exhaust system 106, or a combination thereof, and redirect the exhaust gas to the EGR cooler 404, to the EGR cooler bypass circuit 406, or a combination thereof. By redirecting the exhaust gas as described above, the temperature of the recirculated exhaust gas delivered to the inlet of the compressor 104 can be adjusted. In one embodiment, the EGR cooler bypass valve 402 is provided as a three port valve having a rotor that can be actuated (e.g., under control of ECU 116) to selectively place the inlet of the EGR cooler 404 or the EGR cooler bypass circuit 406 in fluid communication with the outlet of the exhaust manifold 10b, the outlet of the exhaust system 106, or a combination thereof.

In certain embodiments, the EGR cooler bypass valve 402 can be actuated to adjust a ratio of exhaust gas flow into the EGR cooler 404 to exhaust gas flow into the EGR cooler bypass circuit 406. Although the EGR cooler bypass valve 402 has been described as a three port valve, it will be appreciated that the EGR cooler bypass valve 402 may be provided as any other suitable valve, or system of valves, enabling the selective redirection of exhaust gas among the EGR cooler 404 and the EGR cooler bypass circuit 406. In an alternative embodiment, the EGR cooler bypass valve 402 may be replaced by an orifice or other restriction within one or more conduits conveying exhaust gas from the exhaust manifold 10b, the exhaust system 106, or a combination thereof. In yet another embodiment, the EGR cooler bypass valve 402 may be removed, providing a substantially unobstructed branch between conduits conveying exhaust gas to the inlets of the EGR cooler 404 and the EGR cooler bypass circuit 406.

As exemplarily illustrated, the EGR cooler bypass valve 402 is disposed upstream of the inlet of the EGR cooler 404, and upstream of the EGR cooler bypass circuit 406. In another embodiment, however, the EGR cooler bypass valve 402 can be disposed downstream of an outlet of the EGR cooler 404 and downstream of the EGR cooler bypass circuit 406.

In one embodiment, the EGR valve 408 is provided as a two port valve that can be actuated (e.g., under control of ECU 116) to control the volume of exhaust gas that is recirculated to the inlet of the compressor 104. As exemplarily illustrated, the EGR valve 408 is disposed downstream of the outlet of the EGR cooler 404, and downstream of the EGR cooler bypass circuit 406. In another embodiment, however, the EGR valve 408 can be disposed upstream of an inlet of the EGR cooler 404 and upstream of the EGR cooler bypass circuit 406.

Figure 12:
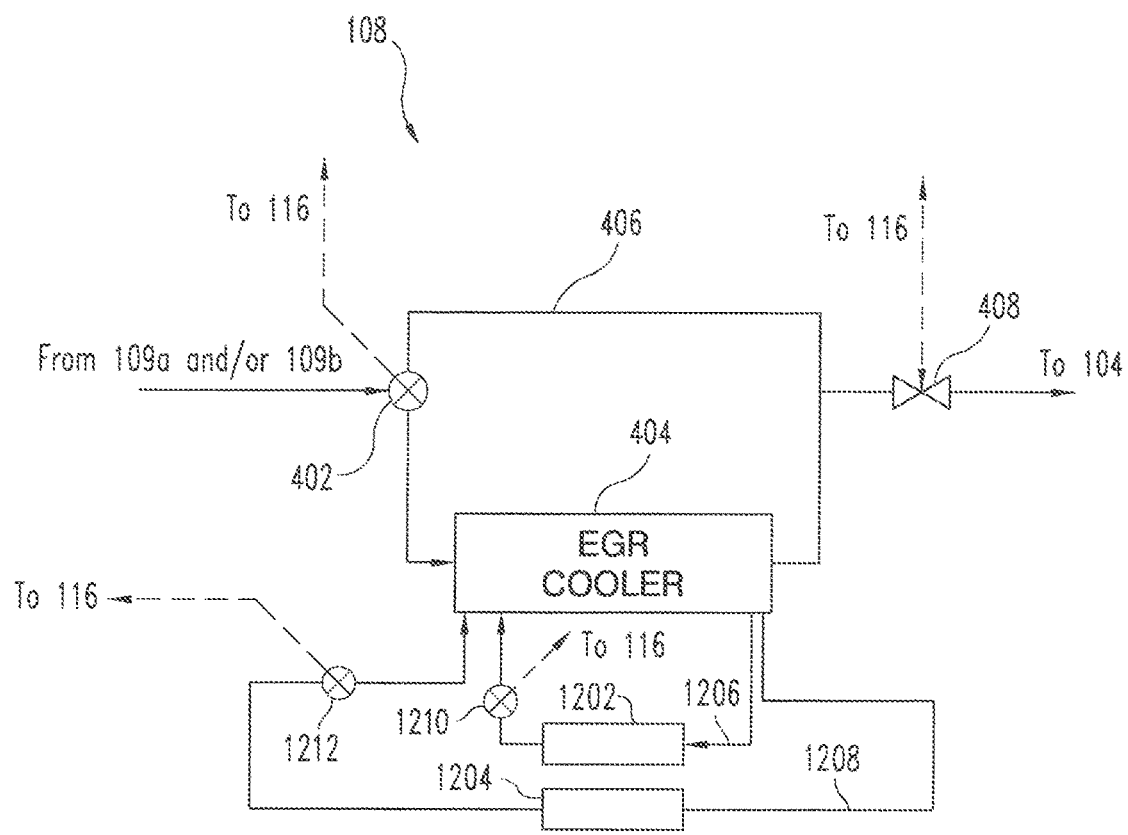
FIG. 12 is a schematic view of an alternate embodiment of an exhaust gas recirculation system usable in embodiments of FIG. 2.

Referencing FIG. 12, an example EGR system 108 is illustrated. The EGR system 108 includes a first EGR coolant provider 1202 and a second EGR coolant provider 1204. The first EGR coolant provider is a high temperature cooling loop 1206 providing high temperature coolant to the EGR cooler 404, and the second EGR coolant provider is a low temperature cooling loop 1208 providing low temperature coolant to the EGR cooler 404. The providing of high temperature and low temperature coolant includes any means understood in the art to provide a high or low temperature coolant.

Without limitation, an example first EGR coolant provider 1202 includes engine coolant, a heated gas stream available in the system 100 (e.g. compressed air from a compressor 104 stage), or any other coolant available in the system. Without limitation, an example second EGR coolant provider 1204 includes any coolant source that, at least during certain engine operating conditions, tends to be a lower temperature coolant than the coolant provided by the first EGR coolant provider 1202. Example and non-limiting low temperature coolant sources include engine coolant having a longer fluid run than the high temperature coolant (e.g. where the low temperature cooling loop 1208 is longer than the high temperature cooling loop 1206), ambient air, and/or a dedicated lower temperature coolant provided for the second EGR coolant provider 1204.

The coolant temperatures that are a high coolant temperature and a low coolant temperature are relative only, and no absolute temperature ranges defining a high coolant temperature or low coolant temperature are required. An example system 100 includes a high coolant temperature of about 90° C. and a low coolant temperature of about 60° C., although any temperatures of a coolant available in the system 100 are contemplated herein. Regardless of the temperature difference between the high coolant temperature and the low coolant temperature, the ECU 116 is structured, in certain embodiments, to provide the high temperature coolant, low temperature coolant, or a selectable mixture thereof, to the EGR cooler 404 to control the outlet temperature of the EGR gas. Any temperature difference between the high temperature coolant and the low temperature coolant, even where the difference is only present at certain engine operating conditions, provides a control element for the ECU 116 to adjust the temperature of the EGR gas. An example EGR system 108 includes a high temperature coolant valve 1210 and/or a low temperature coolant valve 1212. The position of any high temperature coolant valve 1210 and/or low temperature coolant valve 1212 is an example engine operational parameter controllable by the ECU 116 to reduce the likelihood of engine knock.

Figure 13:
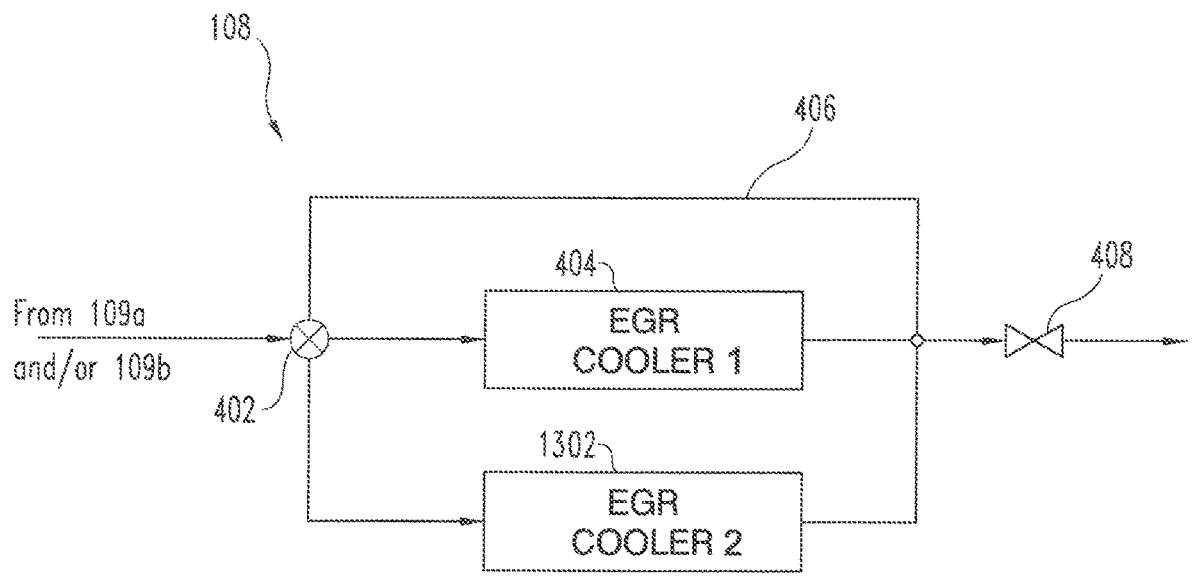
FIG. 13 is a schematic view of another alternate embodiment of an exhaust gas recirculation system usable in embodiments of FIG. 2.

Referencing FIG. 13, an example EGR system 108 is illustrated. The example EGR system 108 includes a first EGR cooler 404 and a second EGR cooler. The EGR coolers 404, 1302, at least in certain engine operating conditions, provide discrete EGR cooling capabilities. The discrete EGR cooling capabilities can be provided by any means understood in the art, including at least a differential coolant temperature for a coolant corresponding to each EGR cooler 404, 1302, a differential effective thermal contact area within each EGR cooler 404, 1302, and/or a differential coolant flow rate within each EGR cooler 404, 1302. The magnitude of any differential between the discrete EGR cooling capabilities is not an important consideration, as long as at least during certain engine operating conditions a significant cooling capability difference exists between the EGR cooler 404, 1302. A minimum value for a significant cooling capability is a difference that exceeds the calibration or measurement error or variability. In certain embodiments, a significant cooling capability difference is greater than 25% difference, and/or greater than 50% difference, during certain operating conditions of the engine. Any cooling capability difference between the first EGR cooler 404 and the second EGR cooler 1302, even where the difference is only present at certain engine operating conditions, provides a control element for the ECU 116 to adjust the temperature of the EGR gas. An example EGR system 108 includes the EGR cooler bypass valve 402 (or valves) capable of providing continuously or discretely selectable flow fractions to the EGR cooler bypass circuit 406, the first EGR cooler 404, and/or the second EGR cooler 1302. The position of any EGR cooler bypass valve(s) 402, and/or the flow fractions through the EGR bypass circuit 406 and/or coolers 404, 1302, are example engine operational parameters controllable by the ECU 116 to reduce the likelihood of engine knock.

In certain embodiments, the EGR system 108 includes an EGR temperature adjustment device. Example and non-limiting EGR temperature adjustment devices include the EGR cooler bypass valve 402, a high temperature coolant valve 1210, and/or a low temperature coolant valve 1212. Any other devices known in the art to provide capability to adjust EGR temperatures are also contemplated herein, for example an EGR coolant flow actuator associated with a single coolant flow on a single EGR cooler (not shown).

Referring back to FIG. 2, the fuel delivery system 110 is structured to deliver fuel to the engine 10. Although not shown, the fuel delivery system 110 includes the fuel tank 12 shown in FIG. 1. In one embodiment, the fuel delivery system 110 can be configured to deliver gasoline to the engine 10. In another embodiment, the fuel delivery system 110 can be configured to deliver another type of fuel, in addition to gasoline, to the engine 10. Examples of such additional fuels include diesel (or other high cetin fuels), natural gas, ethanol, and the like. In one embodiment, the fuel delivery system may include one or more injectors configured to inject fuel into the engine 10 so that it may be combusted within a combustion chamber. Example injectors include direct injectors and port injectors. Example embodiments of the fuel delivery system 110 are described below with respect to FIGS. 8 to 11.

Figure 8:
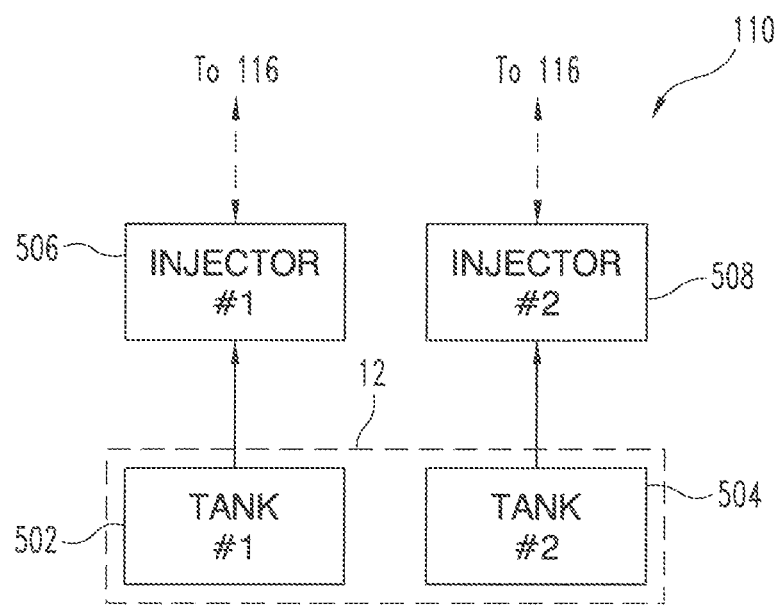
FIGS. 8 to 11 are schematic views to certain embodiments of a fuel delivery system usable in embodiments of FIG. 2.

Referring to FIG. 8, one embodiment of the fuel delivery system 110 shown in FIG. 2 includes a first tank 502, a second tank 504, a first injector 506 and a second injector 508. Together, the first tank 502 and the second tank 504 constitute a system that can be described as the aforementioned fuel tank 12. The first tank 502 and the second tank 504 can be configured to retain a fuel such as gasoline, diesel, natural gas, ethanol, or the like. In one embodiment, the first tank 502 and the second tank 504 are configured to retain different fuels. For example, the first tank 502 can retain a first fuel such as gasoline and the second tank 504 can retain a second fuel such as diesel. As exemplarily illustrated, an outlet of the first tank 502 is disposed upstream of an inlet of the first injector 506 and an outlet of the second tank 504 is disposed upstream of an inlet of the second injector 508.

The first injector 506 and the second injector 508 can be provided as any type of injector suitable for injecting fuel (e.g., under control of ECU 116) into the engine 10 so that fuel can be combusted within a combustion chamber therein. The first injector 506 and the second injector 508 may be provided as the same type of injectors, but arranged at different locations relative to a combustion chamber, or they may be provided as different injectors. For example, the first injector 506 may be provided as a direct injector and the second injector 508 may be provided as a port injector. In another example, the first injector 506 and the second injector 508 may both be provided as direct injectors or port injectors. In one embodiment, use of a direct injector can improve in-cylinder charge temperatures to minimize the occurrence of knock. A direct injector can also improve engine and after-treatment warm-up to allow quick engine operation at optimal efficiency. In one embodiment, use of multiple injectors (e.g., a direct injector and a port injector) can create multiple sources of ignition of fuel, allowing for fast combustion rates. Use of multiple injectors also creates large amounts of ignition energy, which can ignite dilute mixtures at high cylinder pressures. As exemplarily illustrated, the first injector 506 is configured to inject fuel retained within first tank 502 and the second injector 508 is configured to inject fuel retained within second tank 504.

Figure 9:
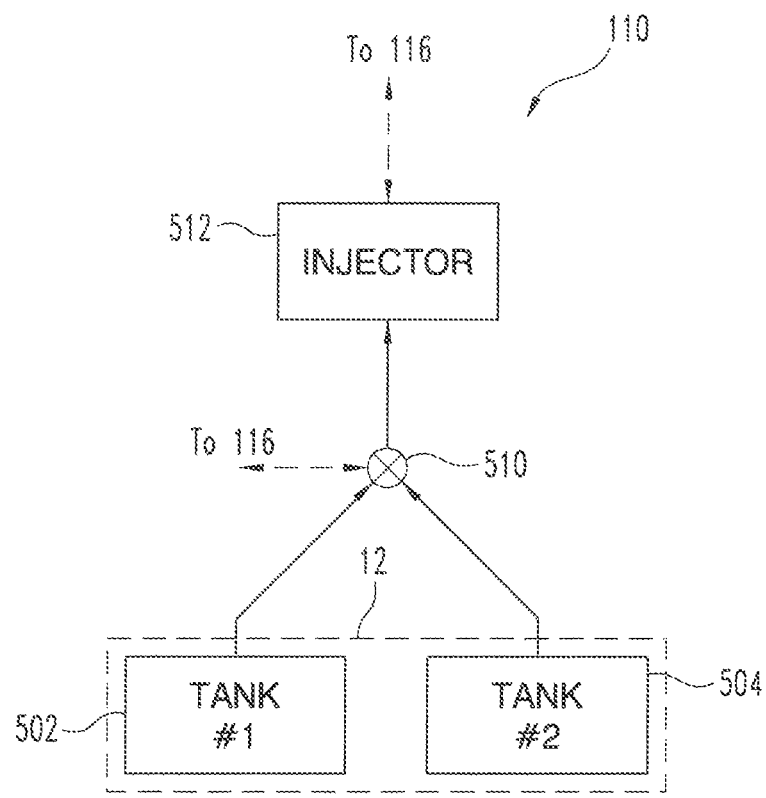

Referring to FIG. 9, a fuel delivery system 110 according to another embodiment includes the aforementioned first tank 502 and the second tank 504, and further includes a fuel delivery valve 510 and an injector 512. The first tank 502 and the second tank 504 may be provided as exemplarily described above with respect to FIG. 8. The injector 512 may be provided as a direct injector or as a port injector.

In the illustrative example, the fuel delivery valve 510 is configured to receive fuel from the first tank 502, the second tank 504, or a combination thereof, and pass the fuel to the injector 512. In one embodiment, the fuel delivery valve 510 is provided as a three port valve having a rotor that can be actuated (e.g., under control of ECU 116) to selectively place the inlet of the injector 512 in fluid communication with the outlet of the first tank 502 or the outlet of the second tank 504. In another embodiment, the fuel delivery valve 510 can be actuated to adjust a ratio of fuel conveyed from the first tank 502 to fuel conveyed from the second tank 504.

Figure 10:
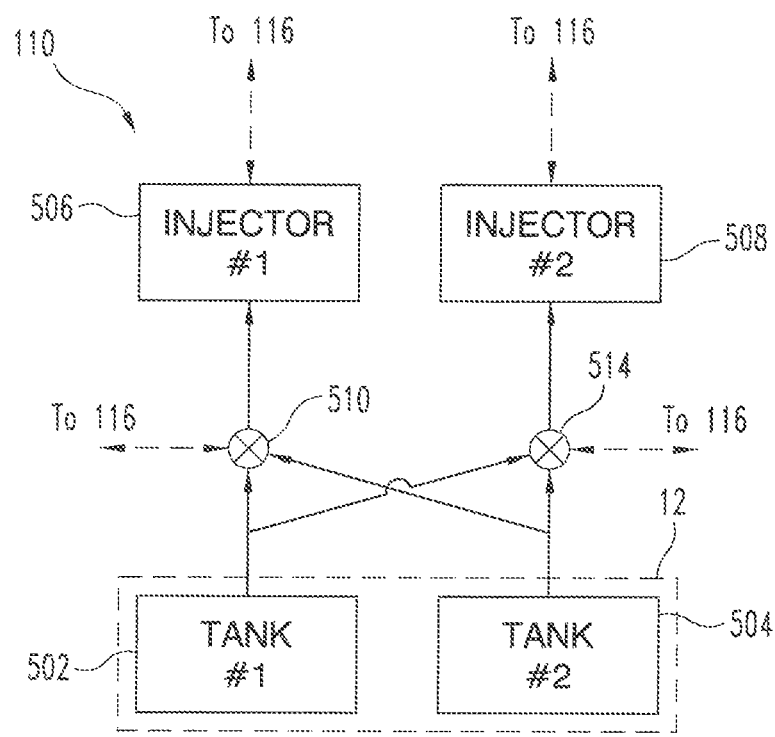

Referring to FIG. 10, a fuel delivery system 110 according to yet another embodiment includes the aforementioned first tank 502, second tank 504, first injector 506, second injector 508 and fuel delivery valve 510, and further includes an additional fuel delivery valve 514. The first tank 502, second tank 504, first injector 506 and second injector 508 may be provided as exemplarily described above with respect to FIG. 8. Likewise, the fuel delivery valve 510 may be provided as exemplarily described above with respect to FIG. 9.

The additional fuel delivery valve 514 may be provided in a similar manner as the fuel delivery valve 510. For example, the additional fuel delivery valve 514 is configured to receive fuel from the first tank 502, the second tank 504, or a combination thereof, and pass the fuel to the second injector 508. In one embodiment, the additional fuel delivery valve 514 is provided as a three port valve having a rotor that can be actuated (e.g., under control of ECU 116) to selectively place the inlet of the second injector 508 in fluid communication with the outlet of the first tank 502 or the outlet of the second tank 504. In another embodiment, the additional fuel delivery valve 514 can be actuated to adjust a ratio of fuel conveyed from the first tank 502 to fuel conveyed from the second tank 504.

Figure 11:
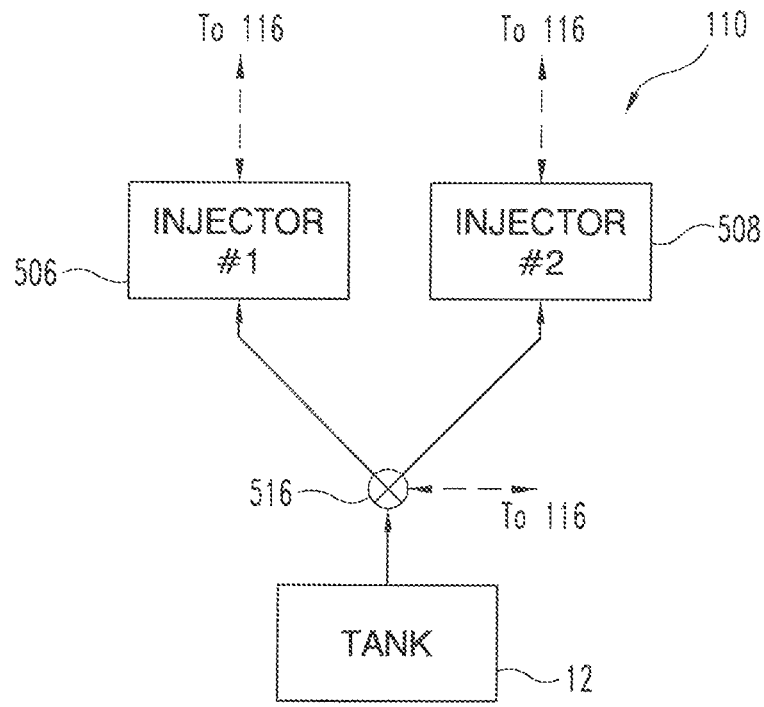

Referring to FIG. 11, a fuel delivery system 110 according to still another embodiment includes the aforementioned first injector 506 and second injector 508, and further includes a single tank such as tank 12 and a fuel delivery valve 516. The first injector 506 and second injector 508 may be provided as exemplarily described above with respect to FIG. 8. The fuel delivery valve 516 may be configured to receive fuel from the tank 12 and pass the fuel to the first injector 506, the second injector 508, or a combination thereof. In one embodiment, the fuel delivery valve 516 is provided as a three port valve having a rotor that can be actuated (e.g., under control of ECU 116) to selectively place the inlet of the first injector 506 or the second injector 508 in fluid communication with the outlet of the tank 12. In another embodiment, the fuel delivery valve 516 can be actuated to adjust a ratio of fuel conveyed to the first injector 506 to fuel conveyed to the second injector 508.

The selection of fuel sources and/or fuel delivery valve 516 positions are example engine operational parameters controllable by the ECU 116 to reduce the likelihood of engine knock. For example and without limitation, an example ECU 116 is structured to adjust a fuel type, a ratio of fuel types, an injection type (e.g. homogenous mixture vs.

direct injection), and/or a ratio of injection types at certain engine operating conditions to reduce the likelihood of engine knock.

Referring back to FIG. 2, the VVT system 112 is structured to adjust (e.g., under control of the ECU 116) the opening and closing of one or more intake valves 20a and one or more exhaust valves 20b associated with one or more cylinders 14 of the engine 10. As described herein, the VVT system 112 refers to any mechanism that can change the lift, duration and/or timing of intake valves 20a and exhaust valves 20b during operation of the engine 10. The VVT system 112 can be provided as any suitable mechanical device (camless or otherwise), electro-hydraulic device, or the like, or a combination thereof. In one embodiment, the VVT system 112 is provided as a dual independent cam phasing system. In one embodiment, the VVT system 112 can be controlled to improve knock margin by changing valve overlap to reduce residual cylinder gases and/or increase pumping efficiency. As used herein, the term "valve overlap" refers to a period of time in an engine cycle during which the intake valve 20a and the exhaust valve 20b of a particular cylinder 14 are simultaneously open. Thus an "amount" of valve overlap refers to the amount of time during which the intake valve 20a and the exhaust valve 20b of a particular cylinder 14 are simultaneously open. The adjustment of engine valve timing by control of the VVT system 112 an example engine operational parameter controllable by the ECU 116 to reduce the likelihood of engine knock.

As mentioned above the exhaust system 106 may, in one embodiment, include a particulate filter 302 disposed upstream of a catalytic converter 304. With the passage of time during engine operation, particulate matter can build up in the particulate filter 302 to that point that further accumulation may threaten to degrade filtration and/or undesirably restrict the flow of exhaust through the exhaust system 106. Therefore, it can be beneficial to remove the particles by oxidation, through a process known as regeneration.

In one embodiment, the VVT system 112 can be configured to regenerate (e.g., under control of the ECU 116) and/or promote regeneration of the particulate filter 302. For example, the particulate filter 302 can be regenerated by controlling the VVT system 112 to increase the amount of valve overlap from a first amount of valve overlap to a second amount of valve overlap. The first amount of valve overlap may be the amount of valve overlap employed when no knock event is occurring within the engine 10. Upon increasing the amount of valve overlap, the amount and/or rate of induction gas flowing from the intake manifold 10a to the exhaust manifold 10b (i.e., scavenging) can be increased. Excess oxygen in the induction gas delivered to the exhaust system 106 is reacted with the particulate matter in the particulate filter 302, allowing the catalytic converter 304 to operate without excess oxygen to effectively reduce NOR.

In certain embodiments, a device is actuated to restrict, reduce, or otherwise prevent exhaust gas from being recirculated to the inlet of the compressor 104, for example a component of the EGR system 108 (e.g., the EGR valve 408), the first valve 109a, and/or second valve 109b can be actuated. Any of the devices to restrict, reduce, or prevent exhaust gas from being recirculated may be under the control of the ECU 116. When the EGR is reduced, restricted, or prevented, the oxygen content of the induction gas delivered to the intake manifold 10a can be modulated or increased.

In one embodiment, the particulate filter 302 can be regenerated periodically, on the basis of a particulate load in the particulate filter 302, a temperature of the particulate filter 302, or the like or a combination thereof. The particulate filter 302 is regenerated periodically by providing a sufficiently high exhaust gas temperature, and/or by utilizing an already provided sufficiently high exhaust gas temperature, and further by providing sufficient oxygen or oxidizing constituents (e.g. $NO_2$) in the exhaust gas to support the particulate filter 302 regeneration. In certain embodiments, excess oxygen or oxidizing constituents are provided at a low enough level such that the particulate filter 302 is regenerated, but that the catalytic converter 304 continues to operate normally. In certain embodiments, the catalytic converter 304 is capable to operate lean, and/or the operations of the catalytic converter 304 are not required at all times and the regeneration of the particulate filter 302 is prioritized at certain times and operating conditions.

The exhaust throttle 114 is configured to adjust (e.g., under control of the ECU 116) the rate with which exhaust gas is expelled from the engine control system 100. The exhaust throttle 114 is an optional component within the engine control system 100 and may be omitted. In certain embodiments, the exhaust throttle 114 is provided and controllable (e.g. by the ECU 116) to promote flow of EGR and/or to reduce a total gas flow rate through the system 100. In certain embodiments, the position of the exhaust throttle 114 is an example engine operational parameter controllable by the ECU 116 to reduce the likelihood of engine knock.

Additionally or alternatively to the depicted embodiment of FIG. 2, an intake throttle (not shown) may be provided upstream of the compressor 104. In certain embodiments, the intake throttle (not shown) may be provided upstream of one or both of two compressors present in the system 100. The intake throttle is an optional component within the engine control system 100 and may be omitted. In certain embodiments, the intake throttle is provided and controllable (e.g. by the ECU 116) to promote the flow of EGR and/or to reduce a total gas flow rate through the system 100. In certain embodiments, the position of the intake throttle is an example engine operational parameter controllable by the ECU 116 to reduce the likelihood of engine knock.

In certain embodiments, the ECU 116 is structured to detect and/or interpret one or more parameters related to the operation of the engine 10, to determine a knock index value in response to the one or more detected parameters, and to compare the knock index value with a knock threshold value. The knock index value is an incremental indicator of the risk of knock during a combustion event, and may be correlated with a modeled or measured knock probability, a knock measurement device, a sound threshold, an in-cylinder measurement installed in a test engine, and/or any other indicator of knock understood in the art. The knock threshold value is a selected threshold for the indicator of the risk of knock according to the selected indication method. The selection of units for the knock index value, or the selection of a magnitude scale for a dimensionless knock index value, are mechanical steps for one of skill in the art having the benefit of the disclosure herein. In certain embodiments, a quantitative or qualitative knock description is developed for a test engine, the values of the knock index value are calibrated to the selected parameters related to the engine, and the knock threshold value is set according to the desired knock threshold value and/or the desired knock threshold value with a margin applied.

In certain embodiments, the knock threshold value changes over time, with engine operating conditions, according to operator inputs, or according to other selected criteria. Example and non-limiting operations to adjust the knock threshold value include raising or lowering the knock threshold value as the engine ages, increasing the knock threshold value as the engine load increases, and/or increasing the knock threshold value in response to an operator request for greater response or power output.

The ECU 116 is structured to interpret the parameter(s) related to the operation of the engine 10. Certain operations described herein include operations to interpret one or more parameters. Interpreting, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value. The ECU 116 communicates with any sensor, actuator, datalink, network, or other device in the system 100 according to the selected parameters for a given embodiment.

Example parameters related to the operation of the engine 10 include any parameters that affect or can be correlated to the occurrence of knock. Example and non-limiting parameters related to the operation of the engine 10 include an induction gas temperature at the intake system 102, an induction gas temperature at the intake manifold 10a, an induction gas pressure at the intake manifold 10a, an exhaust gas temperature at the exhaust manifold 10b, an exhaust gas pressure at the exhaust manifold 10b, an exhaust gas temperature at the inlet and/or outlet of the exhaust system 106, an exhaust gas pressure at the inlet and/or outlet of the exhaust system 106, an exhaust gas temperature at the inlet and/or outlet of the EGR system 108, an exhaust gas pressure at the inlet and/or outlet of the EGR system 108, a lift, duration and/or timing of an intake valve 20a and/or an exhaust valve 20b, a rate of fuel injection, a type of fuel injected, a speed of compressor 104, a geometry or position of the turbine 118, a composition of induction gas and/or EGR gas, an engine speed value, an engine load, engine torque, engine power output value, and/or combinations thereof. Additionally or alternatively, an example parameter includes a rate of change or other transformation of any described parameter. The illustrative parameters are example and non-limiting.

In response to the ECU 116 determining that the knock index value exceeds the knock threshold value, the ECU 116 is structured to control an operation of one or more of the components of the engine control system 100 shown in FIGS. 2 to 11 to decrease a likelihood of knock occurring. In certain embodiments, the ECU 116 provides an engine control command, and one or more components of the engine control system 100 are responsive to the engine control command. The engine control command, in certain embodiments, includes one or more messages, and/or includes one or more parameters structured to provide instructions to the various engine components responsive to the engine control command. An engine component responding to the engine control command may follow the command, receive the command as a competing instruction with other command inputs, utilize the command as a target value or a limit value, and/or progress in a controlled manner toward a response consistent with the engine control command.

The operation to decrease the likelihood of knock occurring may or may not decrease the knock index value. For example, an example knock index value is based on an engine torque output value, and the ECU 116 reduces a temperature of the EGR gas flow in response to the knock index value exceeding the knock threshold value. The reduction of the EGR gas flow temperature does not directly decrease the correlated parameter for the knock index value (the engine torque output value), and accordingly the determined knock index value remains high although the likelihood of engine knock is reduced.

In certain embodiments, the ECU 116 is structured to detect and/or interpret one or more parameters that affect or that can be correlated to operation of the particulate filter 302, and to determine whether a particulate filter regeneration is indicated in response to the parameter(s) that affect or can be correlated to operation of the particulate filter 302. Example and non-limiting parameters that affect or can be correlated to operation of the particulate filter 302 include a flow rate through the particulate filter 302, a pressure drop across the particulate filter 302, a pressure at a position upstream of the particulate filter 302, a temperature of exhaust gases flowing through the particulate filter 302, a viscosity of exhaust gases flowing through the particulate filter 302, a temperature of the substrate of the particulate filter 302, estimated or measured particulate emissions of the engine 10, and/or a composition of the exhaust gas passing through the particulate filter 302. The determination of a particulate filter 302 loading and/or an indication for a particulate filter regeneration are mechanical steps for one of skill in the art.

In response to the ECU 116 determining the particulate filter regeneration is indicated, an example ECU 116 controls an operation of the VVT system 112 to regenerate and/or support regeneration of the particulate filter 302. Example operations of the VVT system 112 include operations to raise a temperature of exhaust gases from the engine 10 (e.g. earlier opening of exhaust valves), and/or an operation to enhance an oxygen content of the exhaust gases from the engine 10 (e.g. by passing compressed intake air out of a delayed closing exhaust valve). Any operations of the VVT system 112 to regenerate and/or support regeneration of the particulate filter 302 are contemplated herein. An example ECU 116 is structured to control the fuel delivery system 110 to operate one or more cylinders at a lean condition to increase the temperature and/or available oxygen to regenerate and/or support regeneration of the particulate filter 302.

Figure 14:
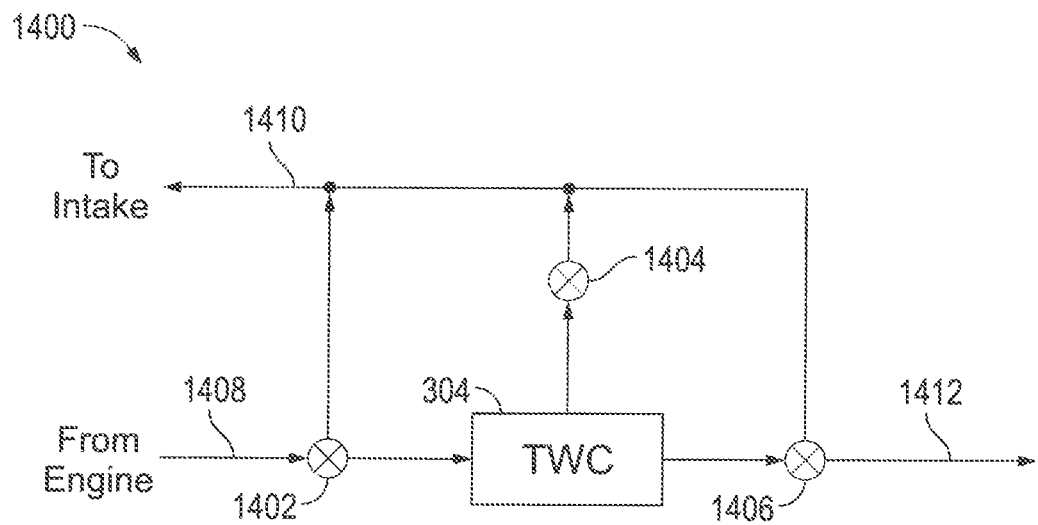
FIG. 14 is a schematic view of a system for controlling aspects of an EGR system.

Referencing FIG. 14, an example system 1400 is illustrated for controlling an EGR flow rate, EGR temperature, and/or an intake manifold temperature. The system 1400 includes an aftertreatment component, depicted in the example as a three-way catalyst 304 (TWC), and a number of control valves 1402, 1404, 1406. A first control valve 1402 provides for EGR recirculation upstream of the TWC 304. A second control valve 1404 provides for EGR recirculation at an intermediate position within the TWC 304. The third control valve 1406 provides for EGR recirculation at a position downstream of the TWC 304. One of skill in the art will recognize that, generally, the more downstream EGR recirculation positions are at a lower pressure from the resulting pressure drop in the TWC 304 and at a lower temperature due to increased heat transfer losses due to residence time in the aftertreatment systems.

Accordingly, in a typical embodiment, changing EGR recirculation positions toward the downstream position (e.g. from the second control valve 1404 to the third control valve 1406) results in a reduced EGR flow rate, reduced EGR temperature, and/or reduced intake manifold temperature. Conversely, changing EGR recirculation positions toward the upstream position results in an increased EGR flow rate, increased EGR temperature, and/or increased intake manifold temperature. However, in certain embodiments the activity on the aftertreatment component and/or the composition of the exhaust gases may provide for a reversal in one or more of the behaviors from the typical embodiment. For example, and without limitation, where the aftertreatment component includes an oxidation catalyst, a temperature rise across the aftertreatment component, providing for a reduced EGR temperature when the EGR recirculation position is moved to a more upstream position.

The provided control valves 1402, 1404, 1406 are non-limiting examples. In certain embodiments, one or more valves 1402, 1404, 1406 may be missing, and one or more valves not shown may be present. In certain embodiments, more than one valve at more than one intermediate position within the aftertreatment component may be provided. The stream 1408 is an exhaust stream from the engine, which may be at a position downstream of one or more turbines, and/or downstream of one or more aftertreatment components which are not depicted. The stream 1410 is an EGR stream which may return to any position in the system, including to a position upstream or downstream of one or more compressors, charge coolers, or other system components. The stream 1412 is an exhaust stream, which may exit the system, and/or pass to a turbine, exhaust valve, aftertreatment component, or any other component. The routing of the EGR stream 1410, for example with the effluents of the control valves 1402, 1404, 1406 being combined, is a non-limiting depiction. The effluents of the control valves 1402, 1404, 1406 may not be combined, and may be routed to the same or distinct positions in the engine intake system. Additionally, other EGR streams may be present in the system 1402 (not shown).

The ECU 116 may operate the control valves 1402, 1404, 1406. In one example, the ECU 116 controls one or more of an EGR temperature, EGR flow rate, and/or intake manifold temperature, where the control operations include operating the control valves 1402, 1404, 1406.

Figure 15:
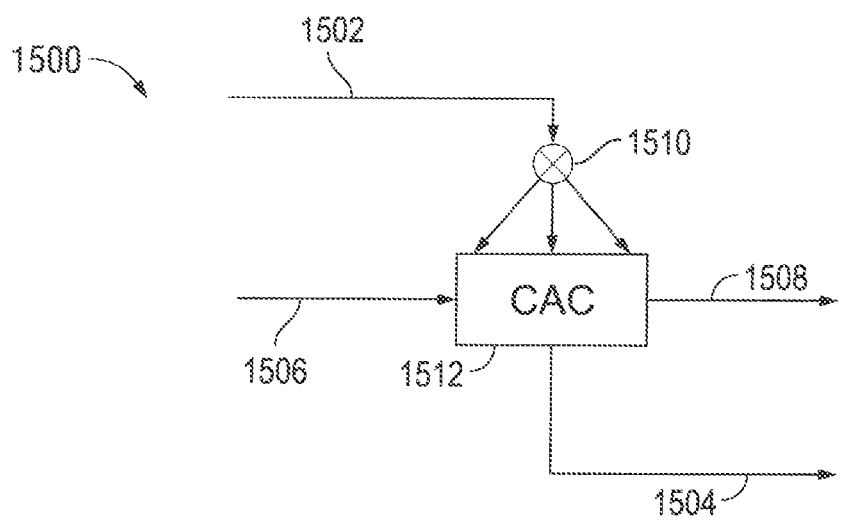
FIG. 15 is an schematic view of a controllable CAC system.

Referencing FIG. 15, an example controllable charge air cooler system 1500 is depicted. The system 1500 includes a charge air cooler 1512 (CAC) which may be an air-to-air or coolant based system. The coolant based system, where present, may share coolant with the engine coolant, and/or may be a separate or dedicated coolant system. Additionally or alternatively, a temperature of the coolant in the coolant based system may be separate from the engine coolant temperature, either through a controllable mechanism, the use of an auxiliary radiator, or through other means. An air-to-air coolant system generally uses ambient air as is known in the art. The system 1500 depicts an uncooled intake air 1506, the cooled intake air 1508, and a downstream coolant stream 1504.

The system 1500 schematically depicts a control valve 1510, which may include one or more physical valves of any type, that provide for a coolant flow 1502 at varying points along the CAC 1512. The system 1500 illustrates three settings for the control valve 1510, but any number of settings including full bypass of the coolant are possible. The system 1500 is depicted providing coolant flow variation by varying the coolant inlet flow position. Alternatively or additionally, the system 1500 can vary the coolant outlet flow position, and/or may internally bypass a portion of the coolant flow within the CAC 1512 such that a portion of the nominal coolant flow area is not available, or is available at a reduced effectiveness, for heat transfer.

The control valve 1510 schematically depicts a manipulation of the effective flow area of the CAC 1512 on the coolant side, and may be realized through other mechanisms than with a valve. For example, and without limitation, one or more louvers, vents, or shrouding devices may be utilized to expose varying amounts of the CAC 1512 to ram air. Where half of the CAC 1512 is blocked from exposure to ram air, the effective flow area of the CAC 1512 on the coolant side is reduced and the total heat transfer occurring in the CAC 1512 is reduced. The control valve 1510 may be operable in a discrete position operation and/or in a continuously variable control operation. Further, regions of the operating range of the control valve 1510 may be discrete or continuous.

In certain embodiments, the control valve 1510 is controllable by an ECU 116, and may be manipulated to control the temperature of the cooled intake air 1508 and/or a temperature of the intake manifold. The operations of the control valve 1510 may be coordinated with control of an EGR temperature and/or flow rate. In certain embodiments, the ECU 116 may control the temperature of the intake air 1508 to ensure that a condensation temperature (e.g. the saturation temperature) of the intake air 1508 is not reached within the CAC 1512. The control of the intake air 1506 above the condensation/saturation temperature may be performed with the use of humidity sensors, humidity data provided to the system through a datalink or network communication, and/or through conservative estimates of the humidity (e.g. assuming 100% relative humidity, using conservative humidity values based on available date and location data, etc.) to ensure that the condensation/saturation temperature of the cooled intake air 1508 is not reached.

Presently known CAC bypass devices can be utilized to manipulate the intake manifold temperature. However, presently known CAC bypass devices bypass some or all of the intake air flow around the CAC. Accordingly, while the final temperature of the intake air in such a device may be achievable to a selected value, the temperature of some portion of the intake air may be brought below the condensation temperature resulting in undesirable liquid water occurring in the intake air system. The system 1500 is an example system providing for control of the intake air 1508 temperature to a selectable value without providing subcooling in portions of the intake air.

Figure 16:
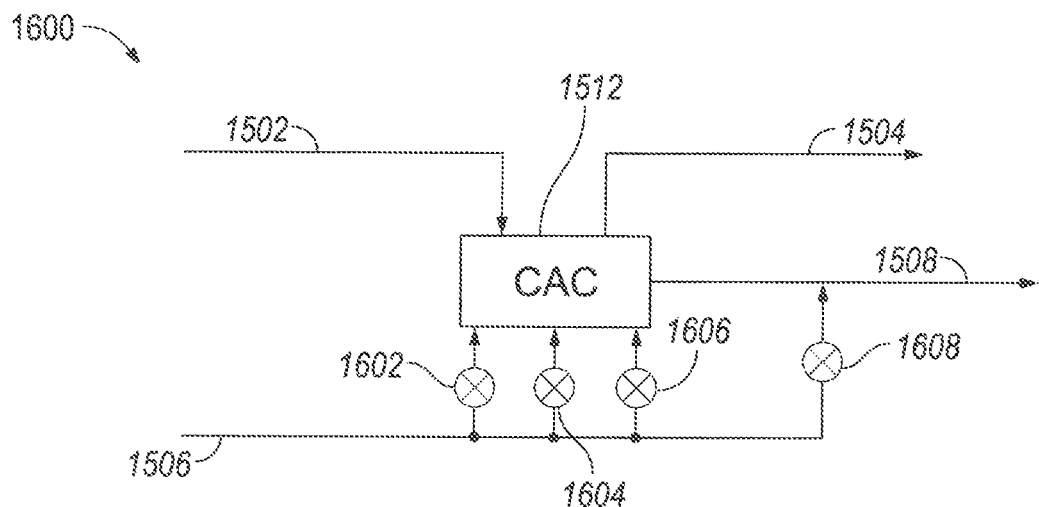
FIG. 16 is an schematic view of another embodiment of a controllable CAC system.

Referencing FIG. 16, an example controllable charge air cooler system 1600 is depicted. The system 1600 differs from the system 1500 in that the intake air side of the CAC 1512 is controllable. Various control valves 1602, 1604, 1606, 1608 depict the intake air 1506 bypassing some or all of the CAC 1512. In contrast to presently known systems, the intake air bypasses the CAC 1512 in a manner that does not provide sub-cooling of portions of the intake air 1506, thereby keeping the intake air 1506 above the condensation/saturation temperature. The system 1500, 1600 are not exclusive, and the control valves 1510, 1602, 1604, 1606, 1608 could be provided on the same system, although such an embodiment is not depicted.

The system 1600 is depicted providing intake air flow variation by varying the intake air inlet flow position. Alternatively or additionally, the system 1600 can vary the intake air outlet flow position, and/or may internally bypass a portion of the intake air flow within the CAC 1512 such that a portion of the nominal intake air flow area is not available, or is available at a reduced effectiveness, for heat transfer.

Figure 17:
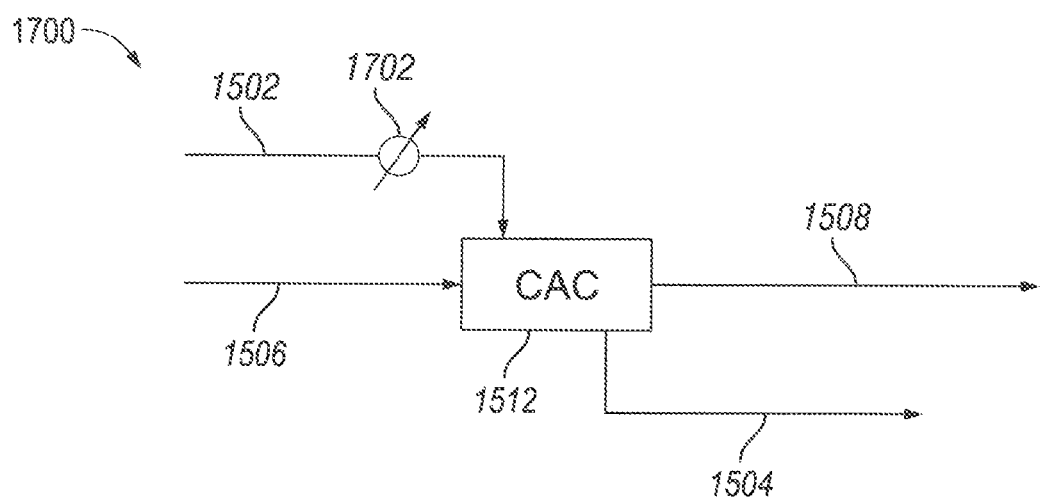
FIG. 17 is an schematic view of another embodiment of a controllable CAC system.

Referencing FIG. 17, another embodiment of a controllable charge air cooler system 1700 is depicted. The system 1700 differs from the system 1500 in that a variable control valve 1702 changes a coolant side flow rate through the CAC 1512. For an engine or liquid coolant based system 1700, the control valve 1702 may bypass a portion of the liquid coolant flow and/or reduce a flow rate of the liquid coolant flow. For an air-to-air CAC 1512, the control valve 1702 may be a vent, louvre, shroud, or other device that reduces a flow rate of ambient air across the CAC 1512. In contrast to the system 1500, rather than blocking a portion of the CAC 1512 from ambient air impingement, the system 1700 reduces the flow rate. However, a system (not depicted) may mix features of the system 1500 and the system 1700, for example reducing the coolant flow rate and/or reducing the coolant effective flow area.

As is evident from the figures and text presented above, a variety of embodiments according to the present disclosure are contemplated.

An example set of embodiments is a system including an internal combustion engine having an intake system that delivers induction gas to an intake manifold of the engine, and a fuel system that provides a mixed fuel and air charge to a combustion chamber of the engine. The system further includes a compressor coupled to an inlet of the intake system, and an exhaust gas recirculation (EGR) system that recirculates exhaust gas to the intake system. The EGR system includes an EGR temperature adjustment device. The system further includes an electronic control unit (ECU) that interprets a parameter affecting an operation of the engine, that determines a knock index value in response to the parameter, and that provides an engine control command in response to the knock index value exceeding a knock threshold value. The EGR temperature adjustment device is responsive to the engine control command.

In certain further embodiments, the EGR system is fluidly coupled to the intake system at a position upstream of the compressor. In still further embodiments, the EGR system is fluidly coupled to an engine exhaust flow at a position downstream of a turbine, where the example system includes a turbocharger including the compressor and the turbine. In certain embodiments, the EGR system is fluidly coupled to the engine exhaust flow at a position downstream of a particulate filter disposed in the engine exhaust flow, and the system further includes an exhaust throttle operationally coupled to the exhaust flow at a position downstream of the EGR system.

In certain embodiments, the parameter affecting the operation of the engine comprises includes an engine speed value, an engine torque value, an intake manifold temperature, an EGR temperature, and/or an intake manifold pressure. In certain embodiments, the EGR temperature adjustment device includes an EGR cooler bypass valve, a low temperature coolant valve, a high temperature coolant valve, and/or an EGR routing valve. Example EGR routing valves include, without limitation, a valve to bypass at least one EGR routing component (e.g. an EGR cooler), a valve to adjust an EGR outlet location, and/or a valve to adjust an EGR inlet location.

An example system includes a charge air cooler that cools induction gases at a position between the compressor and the intake system, where the charge air cooler bypass valve selectively bypasses induction gases around the charge air cooler. Selectively bypassing includes partially or completely bypassing, at a continuously or discretely selectable quantity. The example system includes the charge air cooler bypass valve being responsive to the engine control command.

Another example system includes a high temperature coolant and a low temperature coolant, where the EGR temperature adjustment device selectively couples each of the high temperature coolant and the low temperature coolant to the recirculated exhaust gas. The EGR temperature adjustment device selectively couples each of the high temperature coolant and low temperature coolant at continuously or discretely selectable flow amounts, coupling one or both of the high temperature coolant and the low temperature coolant sequentially or simultaneously. An example system further includes the EGR temperature adjustment device provide a selectable amount of each of the high temperature coolant and the low temperature coolant to the recirculated exhaust gas to the EGR cooler.

In certain embodiments, the system includes a variable valve timing (VVT) system, where the VVT system is responsive to the engine control command. The VVT system may be binary (i.e. two valve timing modes), continuously or discretely variable, and/or the valve timing for each valve may be completely independently controllable. In certain embodiments the fuel system further provides a fuel directly to the combustion chamber. The fuel added directly to the combustion chamber may be the same fuel type as the fuel provided as part of the mixed fuel, and/or the fuel added directly to the combustion chamber may be a distinct fuel type from the fuel provided as part of the mixed fuel.

Another example set of embodiments is a method including interpreting a parameter affecting an operation of an internal combustion engine, determining a knock index value in response to the parameter, and reducing an intake manifold temperature in response to the knock index value exceeding a knock threshold value. In certain embodiments, the reducing the intake manifold temperature includes reducing an exhaust gas recirculation (EGR) gas temperature. The operation to reduce the EGR gas temperature includes, in certain embodiments, operating a low temperature EGR cooler. The operation of the low temperature EGR cooler includes operating the EGR cooler with a coolant having a reduced temperature, with a coolant having an increased coolant flow rate, and/or an EGR cooler having an increased effective thermal contact area between the EGR gases and the coolant.

In certain embodiments, the method includes reducing an engine exhaust backpressure in response to the knock index value exceeding the knock threshold value. The operation to reduce an engine exhaust backpressure, in certain embodiments, thereby reduces residual gases in the combustion chamber. The operation to reduce the engine exhaust backpressure includes, in certain embodiments, reducing an EGR flowing pressure, adjusting an EGR flow route, adjusting a variable geometry turbine position, and/or adjusting an exhaust throttle position.

An example method includes adjusting a variable valve timing system in response to the knock index value exceeding the knock threshold value. In certain embodiments, the method includes fueling the engine at least partially by direct injection in response to the knock index value exceeding the knock threshold value. Yet another example method includes reducing an intake manifold temperature by operating a charge air cooler bypass.

Yet another example set of embodiments is a system including an internal combustion engine having an intake system that delivers induction gas to an intake manifold of the engine, and a fuel system that provides a mixed fuel and air charge to a combustion chamber of the engine. The system further includes a compressor coupled to an inlet of the intake system, and a low pressure exhaust gas recirculation (EGR) system that recirculates exhaust gas to the intake system. The example system includes a means for determining a knock index value and a means for reducing a likelihood of engine knock in response to the knock index value exceeding a knock threshold value. The example system further includes a means for reducing a likelihood of engine knock in response to the knock index value exceeding a knock threshold value.

In certain embodiments, the system further includes a means for regenerating a particulate filter operationally coupled to an engine exhaust system including a three-way catalyst. An example system includes a means for flowing EGR when a temperature of the EGR is below a condensation limit temperature for the EGR. The condensation limit temperature for the EGR includes, in certain embodiments, that EGR gases having a present composition (including water fraction) and heat transfer environment will drop to a dew point temperature of the EGR gases within the EGR flow path, and/or within the EGR cooler.

Figure 18:
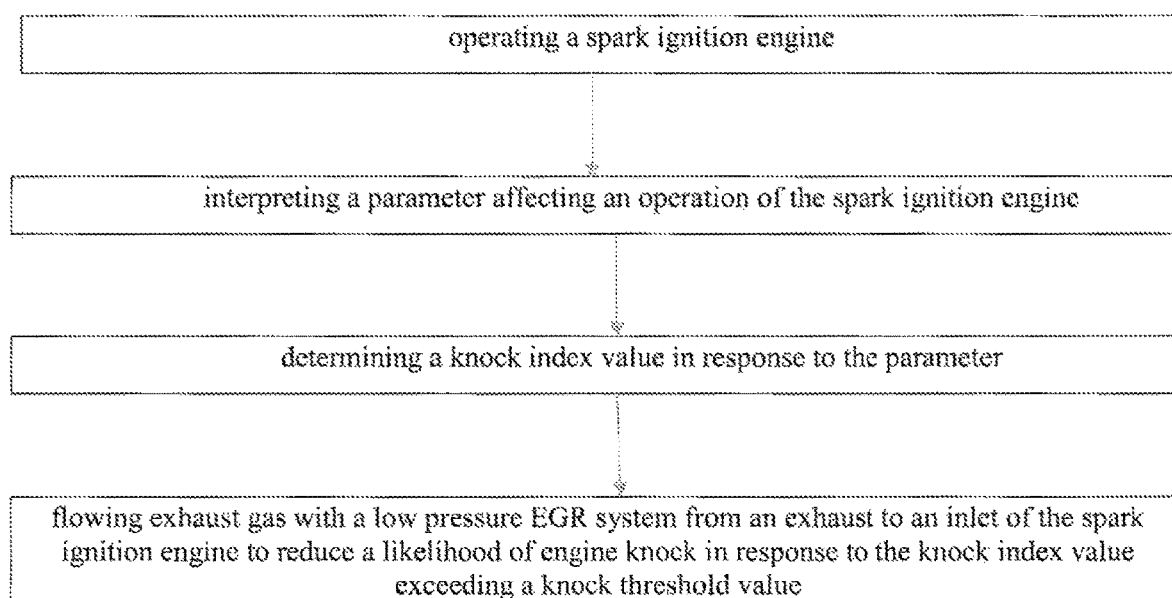
FIG. 18 is a flow diagram of a method according to an embodiment.

Still another example set of embodiments is a method such as shown in FIG. 18, including operating a spark ignition engine, interpreting a parameter affecting an operation of the spark ignition engine, determining a knock index value in response to the parameter, and flowing exhaust gas with a low pressure exhaust gas recirculation (EGR) system from an exhaust to an inlet of the spark ignition engine to reduce a likelihood of engine knock in response to the knock index value exceeding a knock threshold value. In certain further embodiments, the method includes reducing the likelihood of engine knock by reducing an intake manifold temperature of the spark ignition engine. In certain still further embodiments, the method includes reducing the intake manifold temperature by bypassing at least a portion of compressor outlet gases and/or by at least partially bypassing an EGR cooler. An example method further includes reducing the likelihood of engine knock by reducing a coolant temperature for an EGR cooler, by reducing a spark ignition engine backpressure, by adjusting a valve timing for the spark ignition engine, and/or by at least partially fueling the spark ignition engine by direct injection.

Any theory, mechanism of operation, proof, or finding stated herein is meant to further enhance understanding of embodiments of the present invention and is not intended to make the present invention in any way dependent upon such theory, mechanism of operation, proof, or finding. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary. While embodiments of the invention have been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein or by any of the following claims are desired to be protected.

What is claimed is:

1. A system comprising:
    a spark-ignition internal combustion engine having an intake system structured to deliver induction gas to an intake manifold of the engine, a fuel system structured to provide a mixed fuel and air charge to a combustion chamber of the engine, and an exhaust system including a three-way catalyst;
    a compressor coupled to an inlet of the intake system;
    a low pressure exhaust gas recirculation (EGR) system structured to recirculate exhaust gas to the intake system at least from an intermediate position of the three-way catalyst; and
    an electronic control unit (ECU) configured to determine a knock index value and recirculate exhaust gas to the intake system with the low pressure EGR system to reduce a likelihood of engine knock in response to the knock index value exceeding a knock threshold value.

2. The system of claim 1, further comprising a particulate filter operationally coupled to an engine exhaust system upstream of the three-way catalyst.

3. The system of claim 1, wherein the ECU is configured to recirculate the exhaust gas when a temperature of the EGR is below a condensation limit temperature for the EGR.

4. A method, comprising:
    operating a spark ignition engine;
    interpreting a parameter affecting an operation of the spark ignition engine;
    determining a knock index value in response to the parameter; and
    flowing exhaust gas with a low pressure exhaust gas recirculation (EGR) system at least from an intermediate position of a three-way catalyst in the exhaust to an inlet of the spark ignition engine to reduce a likelihood of engine knock in response to the knock index value exceeding a knock threshold value.

5. The method of claim 4, wherein the flowing exhaust gas with the low pressure EGR system reduces an intake manifold temperature of the spark ignition engine.

6. The method of claim 5, further comprising bypassing at least a portion of compressor outlet gases and at least partially bypassing an EGR cooler to reduce the intake manifold temperature.

7. The method of claim 4, further comprising reducing a coolant temperature for an EGR cooler while flowing exhaust gas with the low pressure EGR system.

8. The method of claim 4, wherein flowing exhaust gas with the low pressure EGR system reduces a spark ignition engine backpressure and the low pressure EGR system is further operable to flow the exhaust gas from a location upstream of and downstream of the three-way catalyst.

9. The method of claim 4, further comprising adjusting a valve timing for the spark ignition engine to reduce the likelihood of engine knock.

10. The method of claim 4, further comprising at least partially fueling the spark ignition engine by direct injection to reduce the likelihood of engine knock.

11. A system comprising:
    a spark-ignition internal combustion engine having an intake system configured to deliver induction gas to an intake manifold of the engine, a fuel system structured to provide a mixed fuel and air charge to a combustion chamber of the engine, and an exhaust system including a three-way catalyst;
    a compressor coupled to an inlet of the intake system and providing a compressed air stream;

a low pressure exhaust gas recirculation (EGR) system configured to recirculate exhaust gas at least from an intermediate position of the three-way catalyst to the intake system upstream of the compressor;

a charge-air-cooler (CAC) structured to cool at least a portion of the compressed air stream, the CAC including a variable cooling performance device;

an electronic control unit (ECU) structured to:
   interpret a parameter affecting an operation of the engine;
   determine a knock index value in response to the parameter; and
   provide an engine control command in response to the knock index value exceeding a knock threshold value;

wherein the low pressure EGR system and the variable cooling performance device are responsive to the engine control command to reduce a likelihood of engine knock in response to the knock index value exceeding a knock threshold value.

12. The system of claim 11, wherein the variable cooling performance device comprises a variable coolant side effective flow area device for the CAC and the variable coolant side effective flow area device comprises a coolant inlet position control device.

13. The system of claim 11, wherein the variable cooling performance device comprises a variable coolant side effective flow area device for the CAC and the variable coolant side effective flow area device comprises a coolant outlet position control device.

14. The system of claim 11, wherein the variable cooling performance device comprises a variable coolant side flow rate device.

15. The system of claim 11, wherein the variable cooling performance device comprises a compressed air stream inlet position control device.

16. The system of claim 11, wherein the wherein the variable cooling performance device comprises a compressed air stream outlet position device.

17. The system of claim 11, wherein the variable cooling performance device comprises a means for providing a reduced cooling effectiveness in the CAC, the means including cooling the entire compressed air stream.

18. The system of claim 17, wherein the ECU is further structured to provide the reduced cooling effectiveness in response to a condensation temperature of the compressed air stream.

19. The system of claim 11, wherein the ECU is further structured to interpret a condensation temperature of the compressed air stream, and wherein the providing the engine control command is further in response to the condensation temperature.

* * * * *